(12) United States Patent
Igarashi et al.

(10) Patent No.: US 11,350,515 B2
(45) Date of Patent: May 31, 2022

(54) LASER SYSTEM

(71) Applicants: Gigaphoton Inc., Tochigi (JP); The University of Tokyo, Tokyo (JP)

(72) Inventors: Hironori Igarashi, Oyama (JP); Kouji Kakizaki, Oyama (JP); Yohei Kobayashi, Tokyo (JP); Shuntaro Tani, Tokyo (JP)

(73) Assignees: Gigaphoton Inc., Tochigi (JP); The University of Tokyo, Tokyo (JP)

(*) Notice: Subject to any disclaimer, the term of this patent is extended or adjusted under 35 U.S.C. 154(b) by 11 days.

(21) Appl. No.: 16/919,216

(22) Filed: Jul. 2, 2020

(65) Prior Publication Data

US 2020/0337145 A1 Oct. 22, 2020

Related U.S. Application Data

(63) Continuation of application No. PCT/JP2018/006278, filed on Feb. 21, 2018.

(51) Int. Cl.
*H05G 2/00* (2006.01)

(52) U.S. Cl.
CPC ............. *H05G 2/008* (2013.01); *H05G 2/003* (2013.01)

(58) Field of Classification Search
CPC .......... H05G 2/00; H05G 2/008; H05G 2/003; G01M 11/00; H01S 3/00; H01S 3/10
See application file for complete search history.

(56) References Cited

U.S. PATENT DOCUMENTS

| 2004/0174955 A1 | 9/2004 | Nam et al. |
| 2013/0186976 A1 | 7/2013 | Ishihara et al. |

(Continued)

FOREIGN PATENT DOCUMENTS

| JP | 2003-124554 A | 4/2003 |
| JP | 2004-273415 A | 9/2004 |

(Continued)

OTHER PUBLICATIONS

International Search Report for PCT/JP2018/006278 dated May 15, 2018.

(Continued)

*Primary Examiner* — Jurie Yun
(74) *Attorney, Agent, or Firm* — Studebaker & Brackett PC

(57) ABSTRACT

A laser system includes A. a laser apparatus configured to output pulsed laser light; B. a rare gas chamber; C. a light focusing optical system configured to focus the pulsed laser light in the rare gas chamber to excite the rare gas; D. a filter chamber configured to selectively transmit EUV light contained in harmonic light produced in the rare gas chamber; E. an exhauster connected to the filter chamber; F. at least one through hole disposed in the optical path between the rare gas chamber and the filter chamber; G. a rare gas supplier; H. a flow rate control valve configured to control the flow rate of the rare gas flowing from the rare gas supplier into the rare gas chamber; I. a first pressure sensor configured to detect the pressure of the rare gas in the rare gas chamber; J. a first controller configured to control the flow rate control valve in such a way that the pressure detected with the first pressure sensor falls within a reference range; and K. a second controller configured to control the pulse energy of the pulsed laser light outputted from the laser apparatus based at least on the pressure detected with the first pressure sensor.

9 Claims, 19 Drawing Sheets

(56) References Cited

U.S. PATENT DOCUMENTS

| | | |
|---|---|---|
| 2015/0351211 A1 | 12/2015 | Mizoguchi et al. |
| 2016/0087389 A1 | 3/2016 | Niwano et al. |
| 2016/0315442 A1 | 10/2016 | Popmintchev et al. |
| 2016/0353561 A1 | 12/2016 | Enzmann et al. |
| 2017/0336282 A1 | 11/2017 | Kobayashi et al. |
| 2018/0198253 A1 | 7/2018 | Miyamoto et al. |

FOREIGN PATENT DOCUMENTS

| | | |
|---|---|---|
| JP | 2006-226790 A | 8/2006 |
| JP | 2013-175434 A | 9/2013 |
| JP | 2013-195535 A | 9/2013 |
| JP | 2015-026668 A | 2/2015 |
| WO | 2014/147901 A1 | 9/2014 |
| WO | 2016-151682 A1 | 9/2016 |
| WO | 2017-072879 A1 | 5/2017 |

OTHER PUBLICATIONS

Notification of Transmittal of Translation of the International Preliminary Report on Patentability (Chapter I) and Translation of Written Opinion of the International Searching Authority, PCT/JP2018/006278 dated Aug. 27, 2020.
An Office Action; "Notification of Reasons for Refusal", mailed by the Japanese Patent Office dated Feb. 2, 2022, which corresponds to Japanese Patent Application No. 2020-501905 and is related to U.S. Appl. No. 16/919,216; with English language translation.

FIG. 14

| No. | PRESSURE P1 | PRESSURE P2 | AREA Spin | PRESSURE P' IN LIGHT FOCUSED POSITION |
|---|---|---|---|---|
| 1 | P1(1) | P2(1) | Spin(1) | data1 |
| 2 | P1(1) | P2(1) | Spin(2) | data2 |
| 3 | P1(1) | P2(1) | Spin(3) | data3 |
| 4 | P1(1) | P2(2) | Spin(1) | data4 |
| 5 | P1(1) | P2(2) | Spin(2) | data5 |
| 6 | P1(1) | P2(2) | Spin(3) | data6 |
| 7 | P1(1) | P2(3) | Spin(1) | data7 |
| 8 | P1(1) | P2(3) | Spin(2) | data8 |
| 9 | P1(1) | P2(3) | Spin(3) | data9 |
| 10 | P1(2) | P2(1) | Spin(1) | data10 |
| 11 | P1(2) | P2(1) | Spin(2) | data11 |
| 12 | P1(2) | P2(1) | Spin(3) | data12 |
| 13 | P1(2) | P2(2) | Spin(1) | data13 |
| 14 | P1(2) | P2(2) | Spin(2) | data14 |
| 15 | P1(2) | P2(2) | Spin(3) | data15 |
| 16 | P1(2) | P2(3) | Spin(1) | data16 |
| 17 | P1(2) | P2(3) | Spin(2) | data17 |
| 18 | P1(2) | P2(3) | Spin(3) | data18 |
| 19 | P1(3) | P2(1) | Spin(1) | data19 |
| 20 | P1(3) | P2(1) | Spin(2) | data20 |
| 21 | P1(3) | P2(1) | Spin(3) | data21 |
| 22 | P1(3) | P2(2) | Spin(1) | data22 |
| 23 | P1(3) | P2(2) | Spin(2) | data23 |
| 24 | P1(3) | P2(2) | Spin(3) | data24 |
| 25 | P1(3) | P2(3) | Spin(1) | data25 |
| 26 | P1(3) | P2(3) | Spin(2) | data26 |
| 27 | P1(3) | P2(3) | Spin(3) | data27 |
| ⋮ | ⋮ | ⋮ | ⋮ | ⋮ |

LASER SYSTEM

CROSS-REFERENCE TO RELATED APPLICATIONS

The present application is a continuation application of International Application No. PCT/JP2018/006278, filed on Feb. 21, 2018, the entire contents of which are hereby incorporated by reference.

BACKGROUND

1. Technical Field

The present disclosure relates to a laser system.

2. Related Art

In recent years, rapid progress in miniaturization of a transfer pattern in optical lithography in the semiconductor processes is accompanied by miniaturization in the semiconductor processes. In the next-generation semiconductor processes, microfabrication of a feature ranging from 70 to 45 nm, even microfabrication of a feature smaller than or equal to 32 nm will be required. To this end, for example, to meet the requirement in the microfabrication of a feature smaller than or equal to 32 nm, it is expected to develop an exposure apparatus that is the combination of an extreme ultraviolet light generator for generating extreme ultraviolet (EUV) light having a wavelength of about 13 nm and reduced projection reflection optics.

As the EUV light generator, the following three apparatuses have been proposed: an apparatus based on laser produced plasma (LPP) using plasma produced by irradiation of a target substance with pulsed laser light; an apparatus based on discharge produced plasma (DPP) using plasma produced by discharge; and an apparatus based on synchrotron radiation (SR).

The LPP-based EUV light generator includes a light focusing mirror configured to focus EUV light. A reflectance measurement apparatus is used to accurately measure the reflectance and other factors of the light focusing mirror. The reflectance measurement apparatus includes a laser system configured to output EUV light for reflectance measurement.

CITATION LIST

Patent Literature

[PTL 1] US Patent Application Publication No. 2016/0315442
[PTL 2] JP-A-2004-273415
[PTL 3] WO 2016/151682
[PTL 4] JP-A-2013-195535

SUMMARY

A laser system according to a viewpoint of the present disclosure includes:

A. a laser apparatus configured to output pulsed laser light;
B. a rare gas chamber configured to accommodate a rare gas;
C. a light focusing optical system configured to focus, in the rare gas chamber, the pulsed laser light outputted from the laser apparatus to excite the rare gas;
D. a filter chamber configured to selectively transmit EUV light contained in harmonic light produced in the rare gas chamber;
E. an exhauster connected to the filter chamber;
F. at least one through hole disposed in an optical path of the pulsed laser light between the rare gas chamber and the filter chamber;
G. a rare gas supplier configured to supply the rare gas into the rare gas chamber;
H. a flow rate control valve configured to control a flow rate of the rare gas flowing from the rare gas supplier into the rare gas chamber;
I. a first pressure sensor configured to detect pressure of the rare gas in the rare gas chamber;
J. a first controller configured to control the flow rate control valve in such a way that the pressure detected with the first pressure sensor falls within a reference range; and
K. a second controller configured to control pulse energy of the pulsed laser light outputted from the laser apparatus based at least on the pressure detected with the first pressure sensor.

BRIEF DESCRIPTION OF THE DRAWINGS

Embodiments of the present disclosure will be described below only by way of example with reference to the accompanying drawings.

FIG. 14 shows an example of third data representing the relationship among an area Spin of a through hole, pressure P1 and P2, and pressure P' of the rare gas in a light focused position Cp.

DETAILED DESCRIPTION

Figure 1:
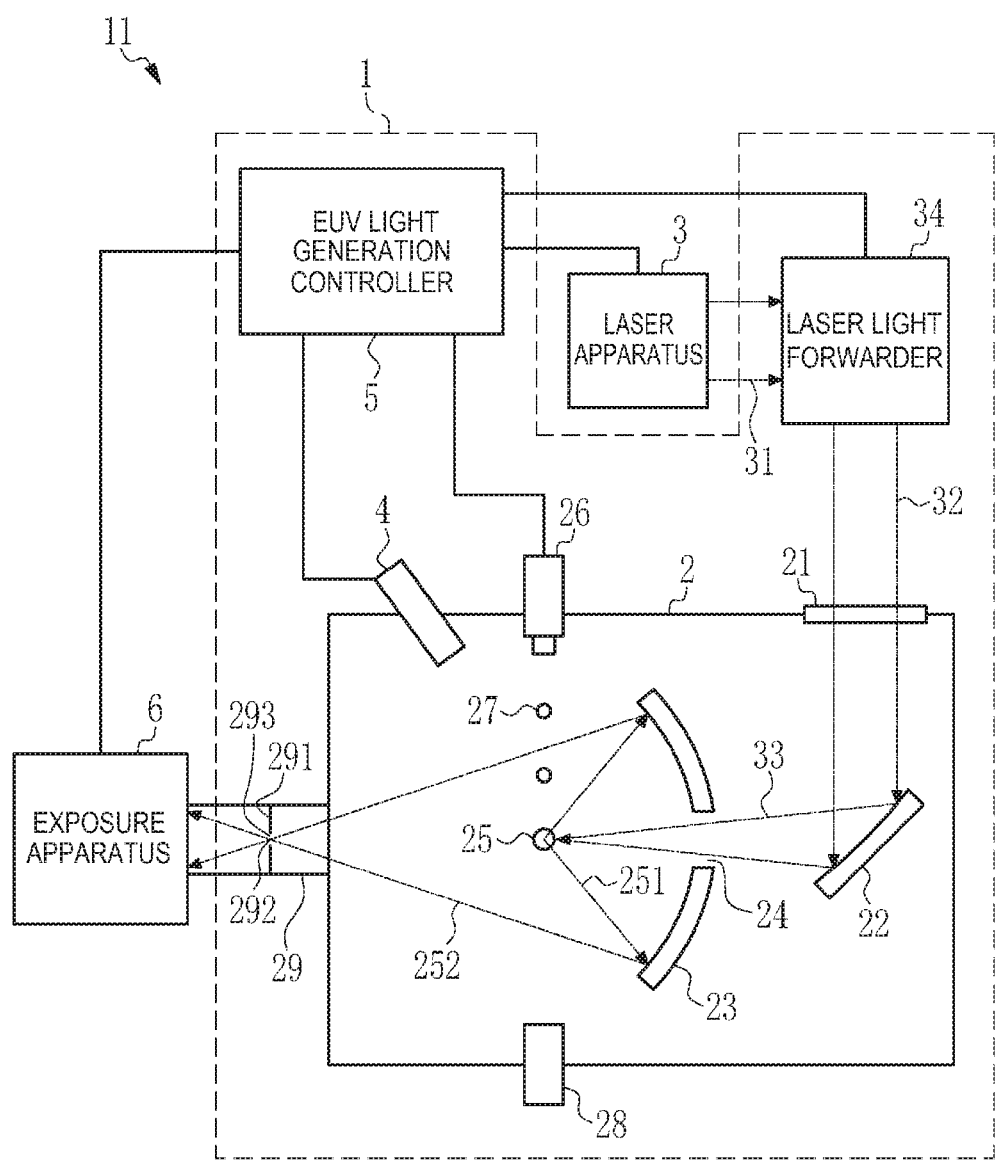
FIG. 1 schematically shows the configuration of an exemplary LPP-based EUV light generation system.

<Contents>
1. Overall configuration of EUV light generation system
1.1 Configuration
1.2 Operation
2. Laser system according to Comparative Example
2.1 Configuration
2.2 Operation
2.3 Problems
3. First Embodiment
3.1 Configuration
3.2 Operation
3.2.1 Preparation and oscillation start operation
3.2.2 Calculate amount of variation in pulse energy of EUV light
3.2.3 Calculate setting value of pulse energy of fundamental wave light
3.3 Effects
4. Second Embodiment
4.1 Configuration
4.2 Operation
4.2.1 Calculate pressure in light focused position
4.2.2 Calculate amount of variation in pulse energy of EUV light
4.3 Effects
5. Third Embodiment
5.1 Configuration
5.2 Operation
5.3 Effects
6. Fourth Embodiment
6.1 Configuration
6.2 Operation
7. Femto-second laser apparatus
7.1 Configuration
7.2 Operation
7.3 Effects Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Overall Configuration of EUV Light Generation System 1.1 Configuration

FIG. 1 schematically shows the configuration of an exemplary LPP-based EUV light generation system. An EUV light generator 1 is used with at least one laser apparatus 3 in some cases. In the present application, a system including the EUV light generator 1 and the laser apparatus 3 is referred to as an EUV light generation system 11.

The EUV light generator 1 includes a chamber 2 and a target supplier 26, as shown in FIG. 1 and described below in detail. The chamber 2 is a sealable container. The target supplier 26 is configured to supply a target substance into the chamber 2 and is, for example, so attached to pass through the wall of the chamber 2. The target substance may be made of tin, terbium, gadolinium, lithium, xenon, or the combination of at least any two thereof but is not necessarily made thereof.

At least one through hole is provided through the wall of the chamber 2. The through hole is closed by a window 21, and pulsed laser light 32 outputted from the laser apparatus 3 passes through the window 21. An EUV light focusing mirror 23 having a reflection mirror, for example, having a spheroidal shape is disposed in the chamber 2. The EUV light focusing mirror 23 has first and second focal points. A multilayer reflection film made, for example, of molybdenum and silicon alternately layered on each other is formed on the surface of the EUV light focusing mirror 23. The EUV light focusing mirror 23 is, for example, so disposed that the first focal point is located in a plasma generation region 25 and the second focal point is located at an intermediate light focused point (IF) 292. A through hole 24 is provided in a central portion of the EUV light focusing mirror 23, and pulsed laser light 33 passes through the through hole 24.

The EUV light generator 1 further includes an EUV light generation controller 5, a target sensor 4, and other components. The target sensor 4 is configured to detect any or a plurality of the timing of passage, the position, the shape, the size, the trajectory, and the speed of a target 27.

The EUV light generator 1 further includes a connector 29 configured to cause the interior of the chamber 2 to communicate with the interior of an exposure apparatus 6. A wall 291, which has an aperture 293 formed therein, is provided in the connector 29. The wall 291 is so disposed that the aperture 293 thereof is located at the second focal point of the EUV light focusing mirror 23.

The EUV light generator 1 further includes a laser light forwarder 34, a laser light focusing mirror 22, a target recoverer 28, and other components. The laser light forwarder 34 includes an optical element configured to specify the state of the forwarded laser light and an actuator configured to adjust the position, attitude, and other factors of the optical element. The target recoverer 28 is configured to recover a residue of the target 27 that has not been converted into plasma.

1.2 Operation

The operation of the exemplary LPP-based EUV light generation system will be described with reference to FIG. 1. Pulsed laser light 31 outputted from the laser apparatus 3 travels via the laser light forwarder 34, passes through as the pulsed laser light 32 the window 21, and enters the chamber 2. The pulsed laser light 32 travels in the chamber 2 along at least one laser light path, is reflected off the laser light focusing mirror 22, and is applied as the pulsed laser light 33 onto at least one target 27.

The target supplier 26 is configured to output the target 27 made of the target substance toward the plasma generation region 25 in the chamber 2. The target 27 is irradiated with at least one pulse contained in the pulsed laser light 33. The target 27 irradiated with the pulsed laser light is converted into plasma, and the plasma radiates radiated light 251. The EUV light focusing mirror 23 is configured to reflect EUV light contained in the radiated light 251 at reflectance higher than the reflectance at which light that belongs to the other wavelength region is reflected. Reflected light 252 containing the EUV light reflected off the EUV light focusing mirror 23 is focused at the intermediate light focused point 292 and outputted to the exposure apparatus 6. It is noted that the one target 27 may be irradiated with a plurality of pulses contained in the pulsed laser light 33.

The EUV light generation controller 5 is configured to oversee the control of the entire EUV light generation system 11. The EUV light generation controller 5 is configured to process the result of the detection performed by the target sensor 4. Based on the result of the detection performed by the target sensor 4, the EUV light generation controller 5 may be configured to control, for example, the timing at which the target 27 is outputted, the direction in which the target 27 is outputted, and other factors. The EUV light generation controller 5 is further configured to control, for example, the timing at which the laser apparatus 3 performs oscillation, the direction in which the pulsed laser light 32 travels, the position in which the pulsed laser light 33 is focused, and other factors. The variety of types of control described above are presented only by way of example, and another type of control may be added as required.

2. Laser System According to Comparative Example

A laser system according to Comparative Example will next be described. The laser system according to Comparative Example is, for example, an EUV coherent light source as an inspection light source used in the reflectance measurement apparatus configured to measure the reflectance of the EUV light focusing mirror 23 in the EUV light generator 1 shown in FIG. 1.

2.1 Configuration

Figure 2:
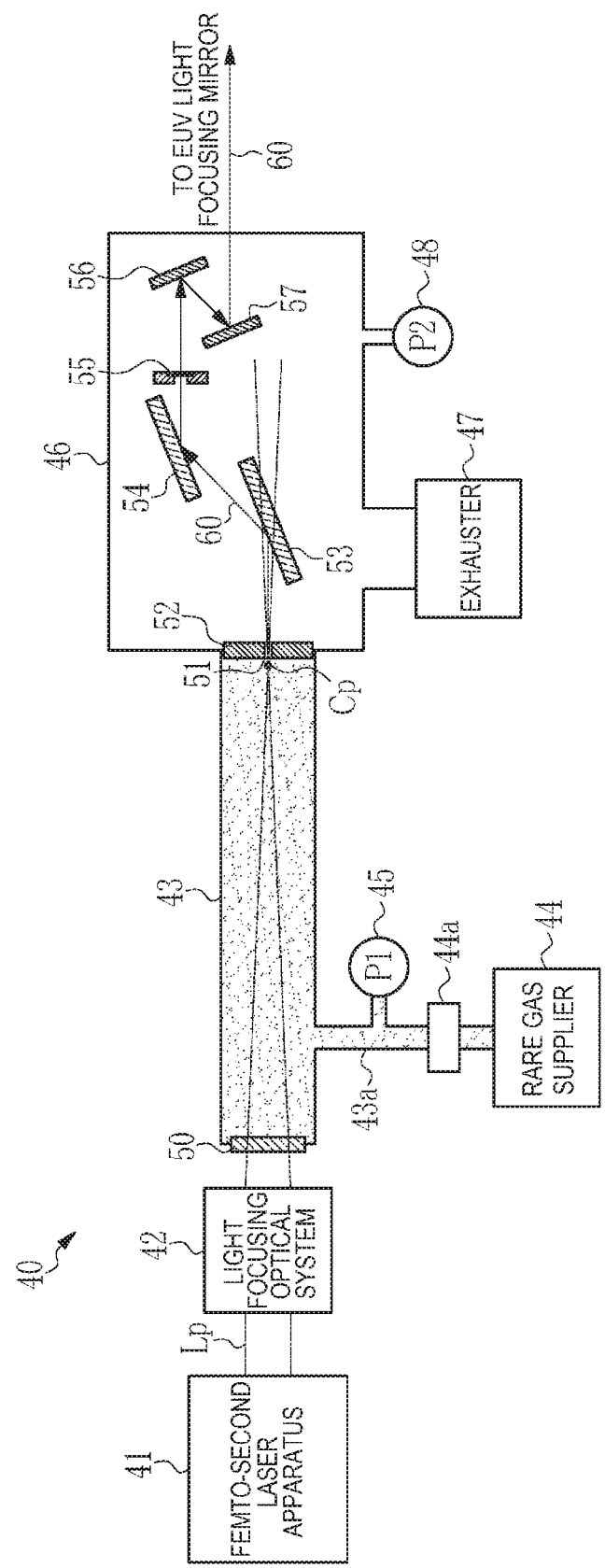
FIG. 2 schematically shows the configuration of a laser system as an inspection light source according to Comparative Example of the present disclosure.

FIG. 2 schematically shows the configuration of a laser system 40 as the inspection light source according to Comparative Example in the present disclosure. The laser system 40 includes a femto-second laser apparatus 41, a light focusing optical system 42, a rare gas chamber 43, a rare gas supplier 44, a first pressure sensor 45, a filter chamber 46, an exhauster 47, and a second pressure sensor 48.

The femto-second laser apparatus 41 is configured to output pumping pulsed laser light Lp having a femto-second (fs) pulse duration for exciting a rare gas. In the present specification, the femto-second laser apparatus is defined as a laser apparatus configured to output pulsed laser light having a pulse duration shorter than 1 ps. The femto-second laser apparatus 41 is configured to output the linearly polarized pumping pulsed laser light Lp as fundamental wave light. The pumping pulsed laser light Lp has a center wavelength of about 796.5 nm, a pulse duration ranging from about 5 to 100 fs, a pulse energy ranging from about 1 to 10 mJ, and a pulse repetition frequency ranging from about 1 to 10 kHz. The femto-second laser apparatus 41 is, for example, a titanium-sapphire laser apparatus.

The light focusing optical system 42 includes any one or a plurality of a planoconvex lens, an aspheric lens, a concave mirror, and an off-axis paraboloidal mirror and is configured to focus the pumping pulsed laser light Lp outputted from the femto-second laser apparatus 41 in a predetermined light focused position Cp in the rare gas chamber 43.

The rare gas chamber 43 accommodates the rare gas and includes a window 50 and a through hole 51. The rare gas supplier 44 is connected to the rare gas chamber 43 via a pipe 43a. The rare gas supplier 44 is connected to a gas cylinder that is not shown but is configured to supply a helium (He) gas or a neon (Ne) gas as the rare gas. The first pressure sensor 45 configured to measure the pressure in the rare gas chamber 43 is connected to the pipe 43a. Further, a flow rate control valve 44a configured to adjust the flow rate of the rare gas flowing from the rare gas supplier 44 into the rare gas chamber 43 is provided between a portion of the pipe 43a that is the portion to which the first pressure sensor 45 is connected and the rare gas supplier 44.

The window 50 is so disposed in the rare gas chamber 43 that the pumping pulsed laser light Lp having exited out of the light focusing optical system 42 is incident on the window 50 substantially at right angles. The window 50 is made, for example, of a magnesium fluoride ($MgF_2$) crystal and is so disposed that the optical axis coincides with the axis of the pumping pulsed laser light. The thickness of the window 50 is, for example, about 1 mm.

The rare gas chamber 43 and the filter chamber 46 are connected to each other via an O ring that is not shown, and the portion where the rare gas chamber 43 and the filter chamber 46 are connected to each other is provided with a partition wall 52. The partition wall 52 is, for example, a metal film made, for example, of aluminum, and the through hole 51 is formed along the optical path of the pumping pulsed laser light Lp. The through hole 51 is formed by irradiating the partition wall 52 with the pumping pulsed laser light Lp and is a pinhole having a substantially circular cross-sectional shape. The light focusing optical system 42 is configured to focus the pumping pulsed laser light Lp in the rare gas chamber 43 in substantially the same position as the position of the through hole 51. The focusing diameter of the pumping pulsed laser light Lp in the light focused position Cp is about 100 μm. The diameter of the through hole 51 is therefore approximately equal to the focusing diameter of the pumping pulsed laser light Lp.

The rare gas is excited by the pumping pulsed laser light Lp as the fundamental wave light focused in the light focused position Cp. A nonlinear effect provided by the excited rare gas produces harmonic light containing odd-numbered, high-order, at least higher than or equal to 59-th harmonic waves coaxially with the pumping pulsed laser light Lp. The 59-th harmonic light is EUV light 60 having a wavelength of about 13.5 nm.

The filter chamber 46 is disposed in the optical path of the pumping pulsed laser light Lp on the downstream of the rare gas chamber 43. In the filter chamber 46 are disposed a first beam separator 53, a second beam separator 54, a bandpass filter 55, a first multilayer film mirror 56, and a second multilayer film mirror 57. The first beam separator 53 and the second beam separator 54 are each a thin film made of zirconium dioxide ($ZrO_2$) or niobium nitride (NbN) and formed on a substrate made of silicon (Si) or silicon dioxide ($SiO_2$). The first beam separator 53 and the second beam separator 54 each function as a dichroic mirror that selectively reflects light having a wavelength band of about 10 to 40 nm out of the light incident on the separator.

The first beam separator 53 is so disposed that the harmonic light and the fundamental wave light having exited out of the rare gas chamber 43 and passed through the through hole 51 are incident as P-polarized light on the first beam separator 53 and the angle of incidence of the fundamental wave light is substantially Brewster's angle. The second beam separator 54 is so disposed as to be parallel to the first beam separator 53 and cause the light reflected off the first beam separator 53 to be incident on the second beam separator 54. Therefore, the light incident on the second beam separator 54 is P-polarized light, and the angle of incidence of the fundamental wave light is substantially Brewster's angle.

The bandpass filter 55 is a Zr-thin-film filter which is formed of a member having a through hole formed therethrough and to which a Zr thin film having a thickness of several hundreds of nanometers is fixed. The bandpass filter 55 is configured to selectively transmit light having a wavelength band ranging from about 7 to 15 nm and reflect or absorb light that belongs to the other wavelength band. The bandpass filter 55 is disposed in the optical path of the light reflected off the second beam separator 54.

The first multilayer film mirror 56 and the second multilayer film mirror 57 are each a multilayer film formed, for example, of a molybdenum (Mo) thin film and a silicon (Si) thin film alternately layered on each other. The first multilayer film mirror 56 is disposed in the optical path of the light having passed through the bandpass filter 55. The second multilayer film mirror 57 is so disposed that the light reflected off the first multilayer film mirror 56 is incident on the second multilayer film mirror 57. The first multilayer film mirror 56 and the second multilayer film mirror 57 are configured to suppress reflection of the 61-th harmonic light having a wavelength of about 13.1 nm and the 57-th harmonic light having a wavelength of about 14.0 nm out of the light having passed through the bandpass filter 55 but reflects the EUV light 60, which is the 59-th harmonic light having the wavelength of 13.5 nm.

An exhauster 47 is connected to the filter chamber 46. The exhauster 47 is configured to exhaust the interior of the filter chamber 46 to cause the pressure in the filter chamber 46 to approach the vacuum pressure. The second pressure sensor 48 configured to measure the pressure in the filter chamber 46 is connected to the filter chamber 46.

The filter chamber 46 is connected to a light forwarder that is not shown but is configured to forward the EUV light 60 to the EUV light focusing mirror 23 disposed in a measurement chamber that is not shown but is part of the reflectance measurement apparatus. The filter chamber 46 and the light forwarder are sealedly connected to each other via an O ring or a metal gasket that is not shown.

2.2 Operation

The operation of the laser system 40 according to Comparative Example will next be described. First, as preparation operation, the exhauster 47 is caused to start operating and lower the pressure in the filter chamber 46 in such a way that pressure P2 detected with the second pressure sensor 48 is close to the vacuum pressure. When the detected pressure P2 is close to the vacuum pressure, the flow rate control valve 44a opens and starts supplying the rare gas into the rare gas chamber 43. The flow rate control valve 44a is then so adjusted that pressure P1 detected with the first pressure sensor 45 is predetermined target pressure PT1. The target pressure PT1 is a value that falls within a range from 10 to 100 kPa and is, for example, about 17 kPa.

The femto-second laser apparatus 41 is then driven to output the pumping pulsed laser light Lp, which has a center wavelength of about 796.5 nm, a pulse duration of about 30 fs, a pulse energy of about 6 mJ, and a pulse repetition frequency of about 1 kHz. The pumping pulsed laser light Lp outputted from the femto-second laser apparatus 41 is focused in the light focused position Cp in the rare gas chamber 43 by the light focusing optical system 42. The focusing diameter of the pumping pulsed laser light Lp is about 100 μm.

The pumping pulsed laser light Lp focused in the light focused position Cp excites the rare gas, and the nonlinear effect provided by the excited rare gas produces harmonic light containing odd-numbered, high-order, at least higher than or equal to 59-th harmonic waves. The 59-th harmonic light is the EUV light 60 having the wavelength of about 13.5 nm. The polarization direction and the light exiting optical axis of the harmonic light coincide with the polarization direction and the light incident optical axis of the pumping pulsed laser light Lp. The harmonic light and the fundamental wave light produced in the light focused position Cp pass through the through hole 51 and is incident on the first beam separator 53 in the filter chamber 46.

Out of the harmonic light and the fundamental wave light incident on the first beam separator 53, light having the wavelength band ranging from about 10 to 40 nm is reflected off the first beam separator 53. The reflected light is incident on the second beam separator 54. Out of the light incident on the second beam separator 54, light having the wavelength band ranging from about 10 to 40 nm is reflected off the second beam separator 54. The reflected light enters the bandpass filter 55. Out of the light having entered the bandpass filter 55, light having the wavelength band ranging from about 7 to 15 nm passes through the bandpass filter 55. The light having passed through the bandpass filter 55 is sequentially reflected off the first multilayer film mirror 56 and the second multilayer film mirror 57. In this process, the reflection of the 61-th and 57-th harmonic light is suppressed.

As described above, out of the harmonic light containing the EUV light 60 produced in the rare gas chamber 43, only the EUV light 60 having the wavelength of 13.5 nm is selected by the filter chamber 46 and outputted from the filter chamber 46 toward the EUV light focusing mirror 23 in the reflectance measurement apparatus.

2.3 Problems

In the reflectance measurement apparatus, about eight hours is necessary for the measurement of the reflectance of one EUV light focusing mirror 23. Therefore, to improve the measurement accuracy and shorten the measurement period, a challenge is long-period stabilization of the output of the EUV light 60 from the laser system 40 as the inspection light source.

To stabilize the output of the EUV light 60 for a long period, it is necessary to fix the pressure of the rare gas in the rare gas chamber 43. When the laser system 40 is continuously operated for a long period, however, the pumping pulsed laser light Lp causes ablation to occur at the partition wall 52 around the through hole 51, undesirably resulting in a change in the size of the through hole 51. A change in the size of the through hole 51 changes the flow rate of the rare gas flowing into the filter chamber 46 through the through hole 51, resulting in a change in the pressure of the rare gas in the rare gas chamber 43.

The pressure of the rare gas in the rare gas chamber 43 responds at a slow speed to the pressure adjustment performed by the flow rate control valve 44a. It is therefore difficult to stabilize the pressure of the rare gas in the rare gas chamber 43 to stabilize the output of the EUV light 60 even when the flow rate control valve 44a is controlled in accordance with a change in the pressure detected with the first pressure sensor 45 to adjust the flow rate of the rare gas.

Figure 3:
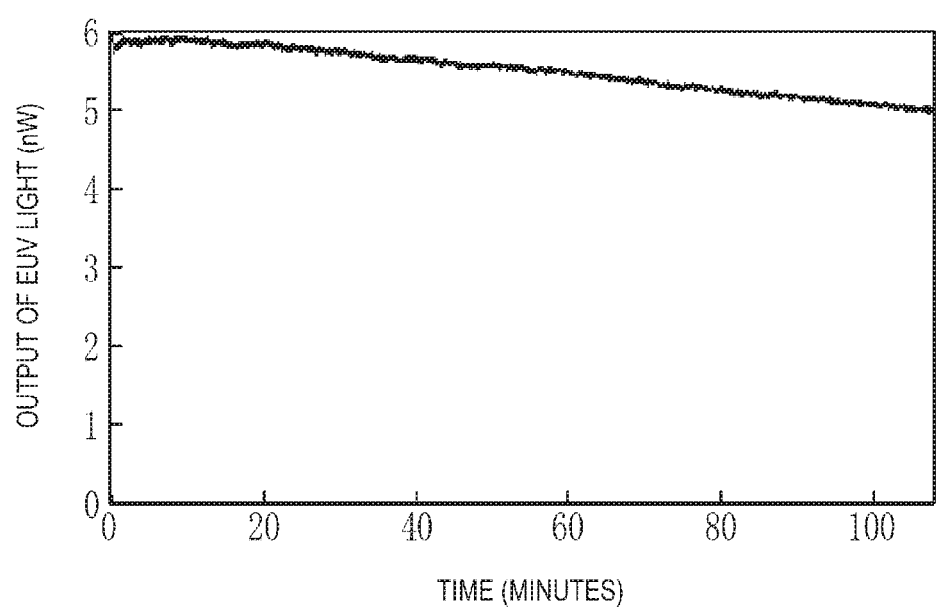
FIG. 3 is a graph showing an example of a temporal change in the output of EUV light outputted from a laser system according to Comparative Example.

FIG. 3 is a graph showing an example of a temporal change in the output of the EUV light 60 at the measurement point in the reflectance measurement apparatus. In the laser system 40 according to Comparative Example, the ablation causes an increase in the size of the through hole 51, resulting in a decrease in the pressure of the rare gas in the rare gas chamber 43 and a decrease in the output of the EUV light 60.

3. First Embodiment

A laser system 40a according to a first embodiment of the present disclosure will next be described. In the following description, substantially the same portion as a component of the laser system 40 according to Comparative Example described above has the same reference character and will not be described as appropriate.

3.1 Configuration

Figure 4:
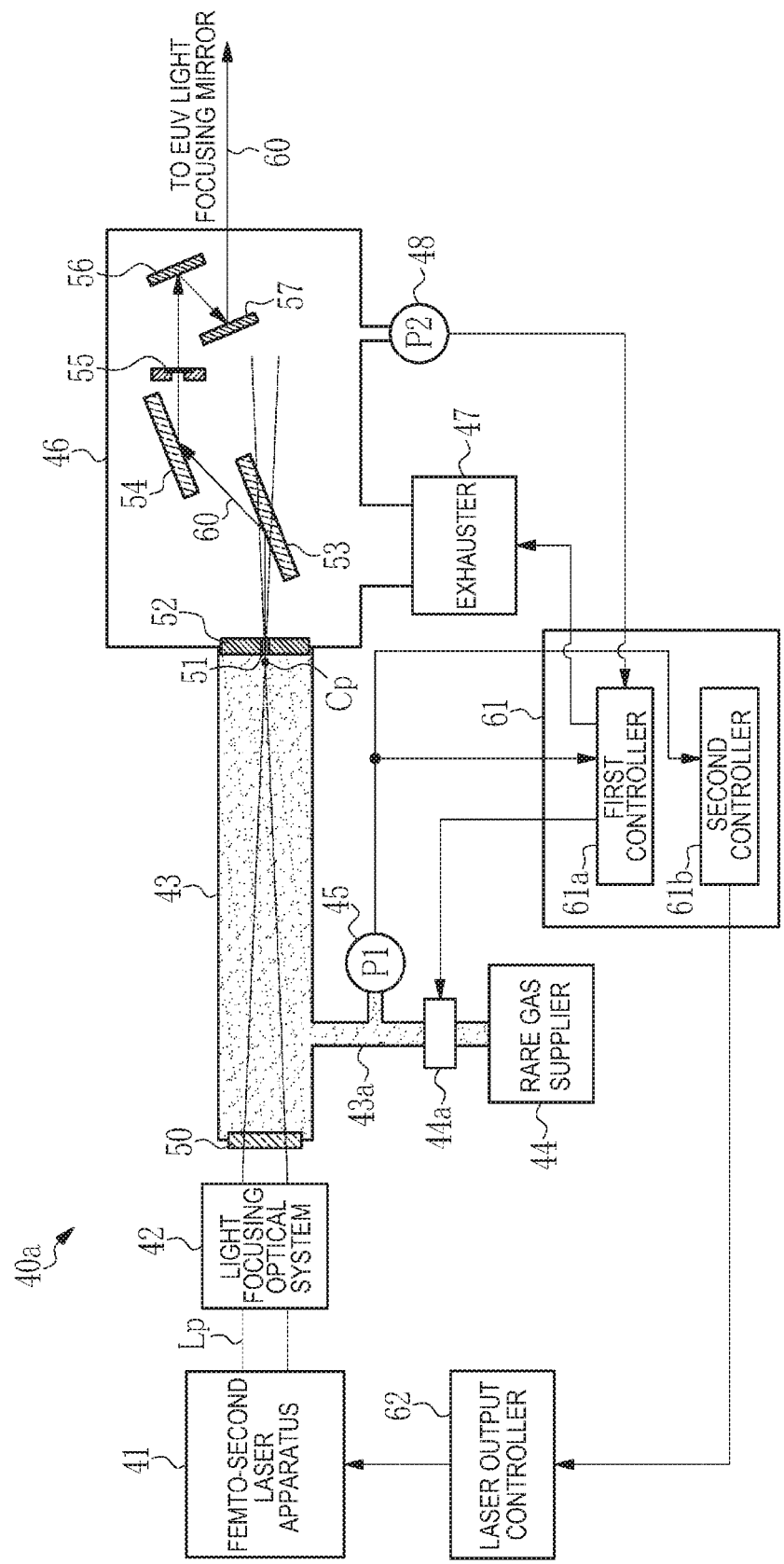
FIG. 4 schematically shows the configuration of a laser system according to a first embodiment.

FIG. 4 schematically shows the configuration of the laser system 40a according to the first embodiment of the present disclosure. The laser system 40a according to the first embodiment includes a primary controller 61 and a laser output controller 62 in addition to the components of the laser system 40 according to Comparative Example. The primary controller 61 is connected to the first pressure sensor 45, the second pressure sensor 48, and the flow rate control valve 44a via corresponding signal lines. The laser output controller 62 is connected to the primary controller 61 and the femto-second laser apparatus 41 via corresponding signal lines.

In the present embodiment, the partition wall 52 is made of metal or glass that is unlikely to undergo ablation due to the pumping pulsed laser light Lp. Examples of the metal material that is unlikely to undergo ablation due to the pumping pulsed laser light Lp may include tungsten (W), molybdenum (Mo), tantalum (Ta), and other high-melting-point metal materials.

The primary controller 61 includes a first controller 61a and a second controller 61b. The first controller 61a is configured to control the flow rate control valve 44a based on the pressure P1 detected with the first pressure sensor 45 and the pressure P2 detected with the second pressure sensor 48. The second controller 61b is configured to control the laser output controller 62 based on the pressure P1 detected with the first pressure sensor 45. The laser output controller 62 is configured to change the pulse energy of the pumping pulsed laser light Lp as the fundamental wave light outputted from the femto-second laser apparatus 41 based on a control signal transmitted from the second controller 61b.

3.2 Operation

Figure 5:
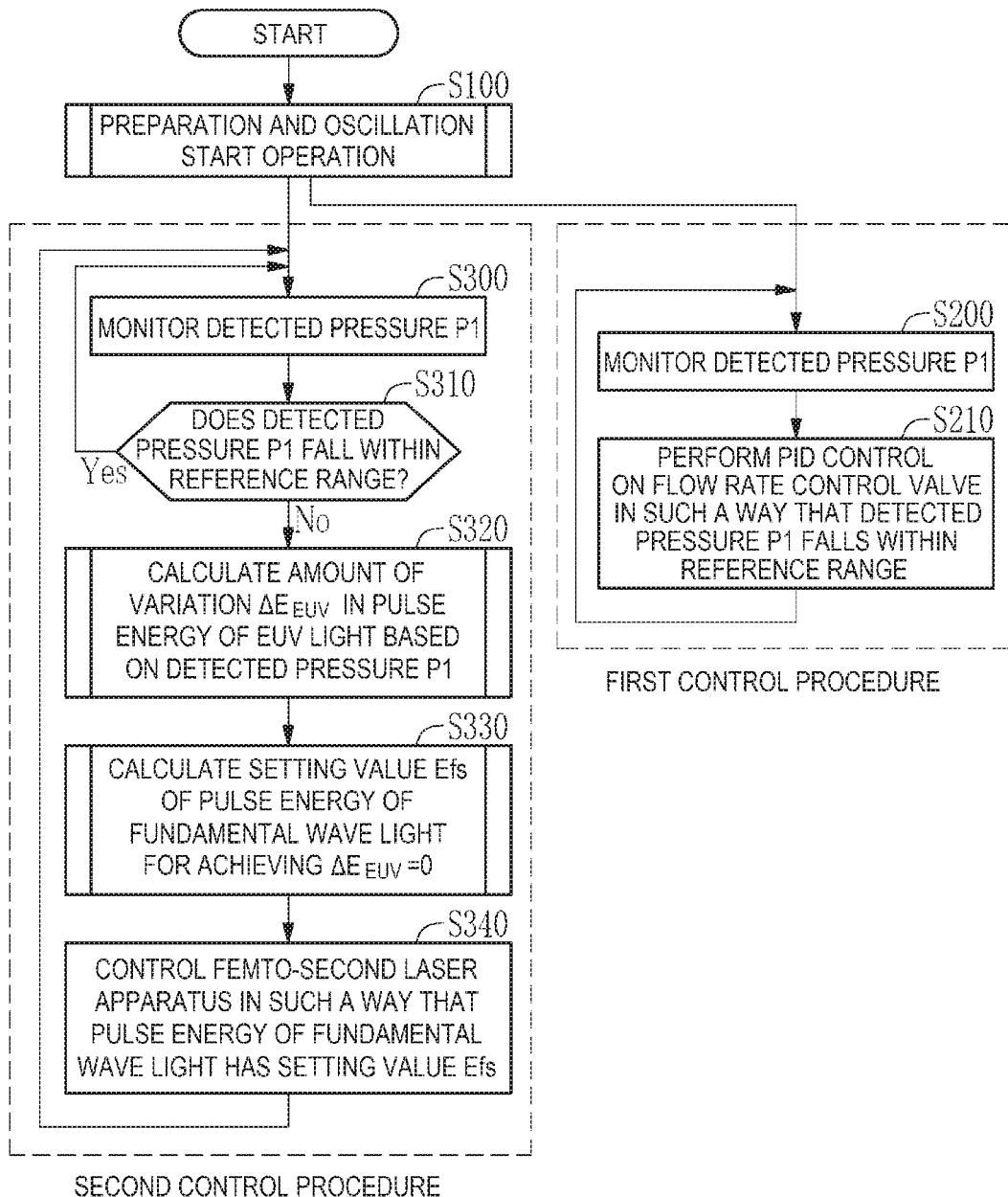
FIG. 5 is a flowchart showing the procedure in accordance with which the laser system is controlled by a primary controller.

The operation of the laser system 40a according to the first embodiment will next be described. FIG. 5 shows the procedure in accordance with which the laser system 40a is controlled by the primary controller 61. The primary controller 61 first, as preparation operation, causes the exhauster 47 to start operating and starts supply of the rare gas into the rare gas chamber 43 and then causes the femto-second laser apparatus 41 to start oscillation (step S100).

The first controller 61a and the second controller 61b provided in the primary controller 61 then concurrently perform a first control procedure (steps S200 to S210) and a second control procedure (steps S300 to S340).

In the first control procedure, the first controller 61a first monitors the pressure P1 detected with the first pressure sensor 45 (step S200). The first controller 61a then performs PID (proportional-integral-differential) control on the flow rate control valve 44a in such a way that the detected pressure P1 falls within a reference range RPs (step S210). Specifically, the first controller 61a transmits a control signal based on the PID control to the flow rate control valve 44a in accordance with the difference between the detected pressure P1 and a reference value. The first controller 61a repeatedly carries out steps S200 and S210 whenever a predetermined period elapses. The reference range RPs is the range of the pressure of the rare gas over which pulse energy $E_{EUV}$ of the EUV light 60 is substantially maximized, that is, the wavelength conversion efficiency is maximized (see FIG. 8). The reference range RPs includes reference pressure Ps, at which the pulse energy $E_{EUV}$ of the EUV light 60 is maximized.

In the second control procedure, the second controller 61b first monitors the pressure P1 detected with the first pressure sensor 45 (step S300) and evaluates whether or not the detected pressure P1 falls within the reference range RPs (step S310). When the detected pressure P1 falls within the reference range RPs (Yes in step S310), the second controller 61b returns to the process in step S300. When the detected pressure P1 does not fall within the reference range RPs (No in step S310), the second controller 61b calculates the amount of variation $\Delta E_{EUV}$ in the pulse energy $E_{EUV}$ of the EUV light 60 based on the detected pressure P1 (step S320).

The second controller 61b then calculates a setting value Efs of the pulse energy of the fundamental wave light for achieving $\Delta E_{EUV}=0$ (step S330). The second controller 61b then transmits a control signal that causes the pulse energy of the pumping pulsed laser light Lp as the fundamental wave light to have the setting value Efs to the laser output controller 62 (step S340). The second controller 61b then returns to the process in step S300. The second controller 61b repeatedly carries out steps S300 to S340 whenever a predetermined period elapses.

3.2.1 Preparation and Oscillation Start Operation

Figure 6:
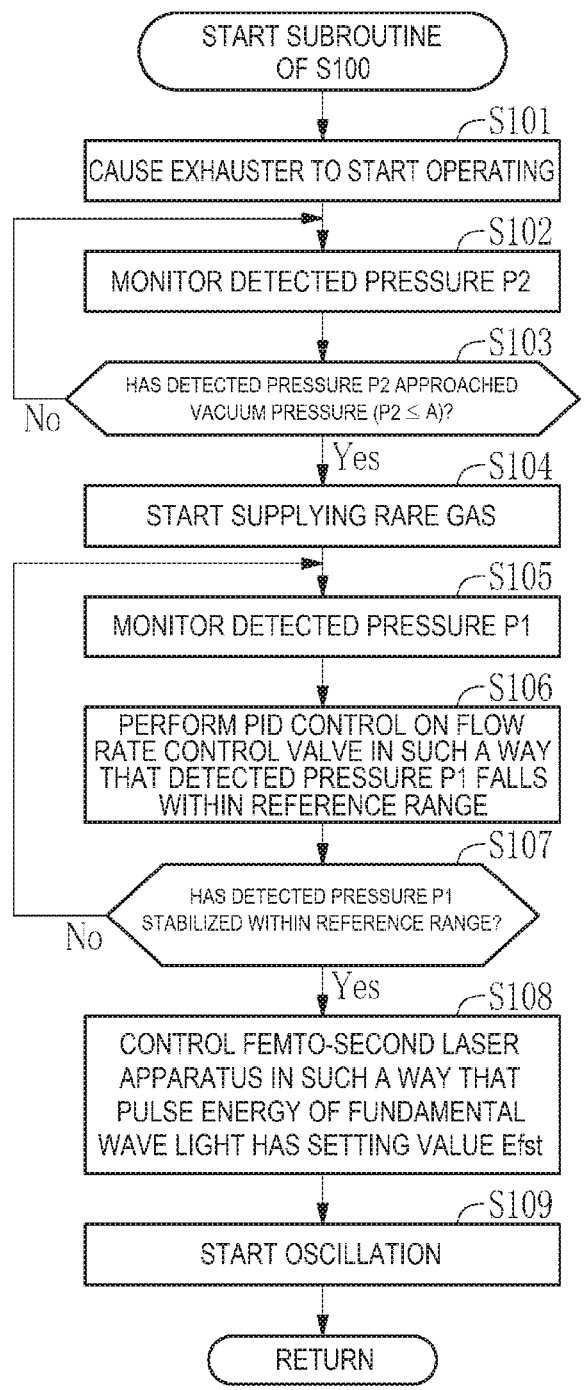
FIG. 6 is a flowchart showing a subroutine of step S100 in the flowchart of FIG. 5.

Step S100 in the flowchart of FIG. 5 will next be described in detail. FIG. 6 shows a subroutine of step S100. In the subroutine, the first controller 61a first causes the exhauster 47 to start operating (step S101). When the exhauster 47 starts operating, the first controller 61a monitors the pressure P2 detected with the second pressure sensor 48 (step S102) and evaluates whether or not the detected pressure P2 has approached the vacuum pressure (step S103). Specifically, the first controller 61a evaluates whether or not P2≤A is satisfied. For example, $A=10^{-2}$ Pa. When P2>A (No in step S103), the first controller 61a returns to the process in step S102. When P2≤A, the first controller 61a controls the flow rate control valve 44a to cause it to start supplying the rare gas into the rare gas chamber 43 (step S104).

When the supply of the rare gas starts, the first controller 61a monitors the pressure P1 detected with the first pressure sensor 45 (step S105). The first controller 61a then performs PID control on the flow rate control valve 44a in such a way that the detected pressure P1 falls within the reference range RPs (step S106). Step S106 is the same as step S210 included in the first control procedure described above. The first controller 61a next evaluates whether or not the detected pressure P1 has stabilized within the reference range RPs (step S107). When the detected pressure P1 has not stabilized within the reference range RPs (No in step S107), the first controller 61a returns to the process in step S105.

When the detected pressure P1 has stabilized within the reference range RPs (Yes in step S107), the second controller 61b transmits a control signal that causes the pulse energy of the fundamental wave light to be an initial value Efst to the laser output controller 62 (step S108). The initial value Efst is a value that causes the pulse energy $E_{EUV}$ of the EUV light 60 to be a predetermined target value when the size of the through hole 51 described above is the initial value. The laser output controller 62 then causes the femto-second laser apparatus 41 to start oscillating (step S109).

3.2.2 Calculate Amount of Variation in Pulse Energy of EUV Light

Figure 7:
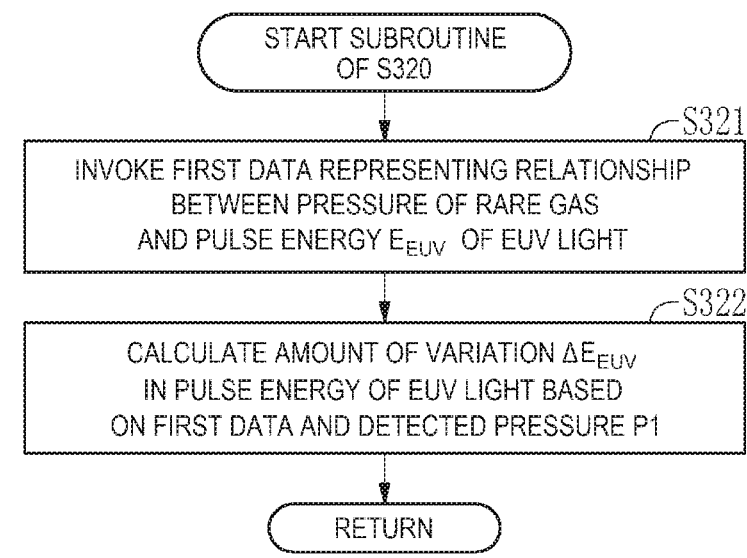
FIG. 7 is a flowchart showing a subroutine of step S320 in the flowchart of FIG. 5.

Step S320 in the flowchart of FIG. 5 will next be described in detail. FIG. 7 shows a subroutine of step S320. In the subroutine, the second controller 61b first invokes first data (see FIG. 8) representing the relationship between the pressure of the rare gas in the rare gas chamber 43 and the pulse energy $E_{EUV}$ of the EUV light 60 in the case where the pulse energy of the fundamental wave light is the initial value Efst (step S321). The first data is stored in the second controller 61b or a storage that is not shown.

Figure 8:
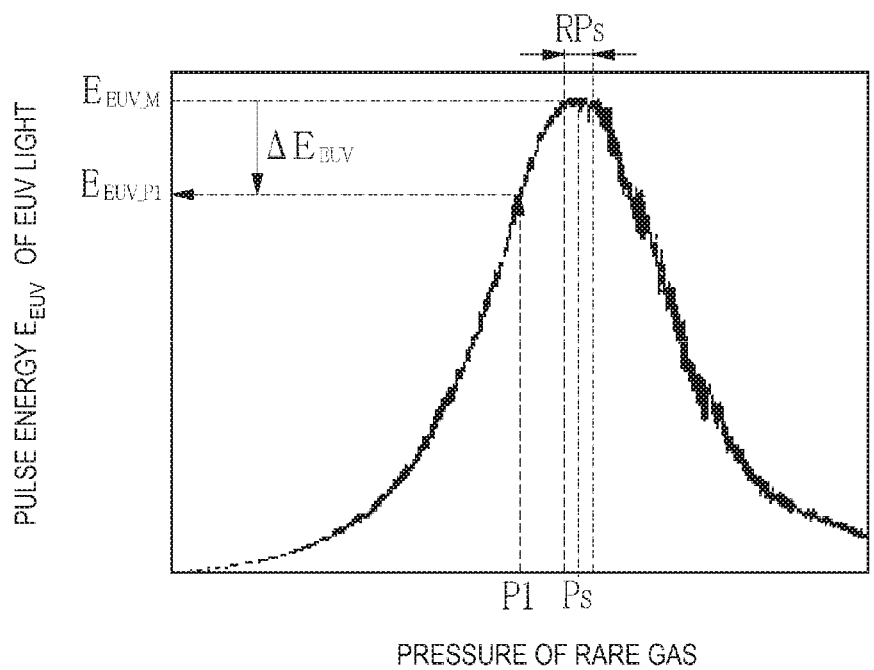
FIG. 8 is a graph showing an example of first data representing the relationship between the pressure of a rare gas and the pulse energy of the EUV light.

The second controller 61b then calculates the amount of variation $\Delta E_{EUV}$ in the pulse energy $E_{EUV}$ of the EUV light 60 based on the first data shown in FIG. 8 and the pressure P1 detected with the first pressure sensor 45 (step S322). Specifically, the second controller 61b calculates based on the first data the difference between pulse energy $E_{EUV\ \#P1}$ of the EUV light 60 that is the pulse energy corresponding to the detected pressure P1 and a maximum $E_{EUV\ \#M}$ of the pulse energy of the EUV light 60 that is the pulse energy corresponding to the pressure of the rare gas.

The second controller 61b may store a function representing the first data in place of the first data and calculate the amount of variation $\Delta E_{EUV}$ by using the function.

3.2.3 Calculate Setting Value of Pulse Energy of Fundamental Wave Light

Figure 9:
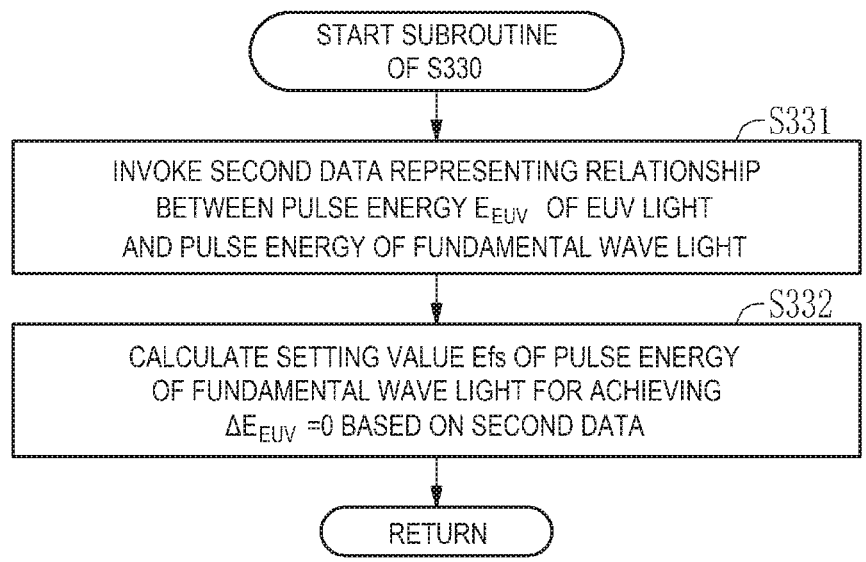
FIG. 9 is a flowchart showing a subroutine of step S330 in the flowchart of FIG. 5.

Step S330 in the flowchart of FIG. 5 will next be described in detail. FIG. 9 shows a subroutine of step S330. In the subroutine, the second controller 61b first invokes second data (see FIG. 10) representing the relationship between the pulse energy $E_{EUV}$ of the EUV light 60 and the pulse energy of the fundamental wave light (step S331). The second data is stored in the second controller 61b or a storage that is not shown.

Figure 10:
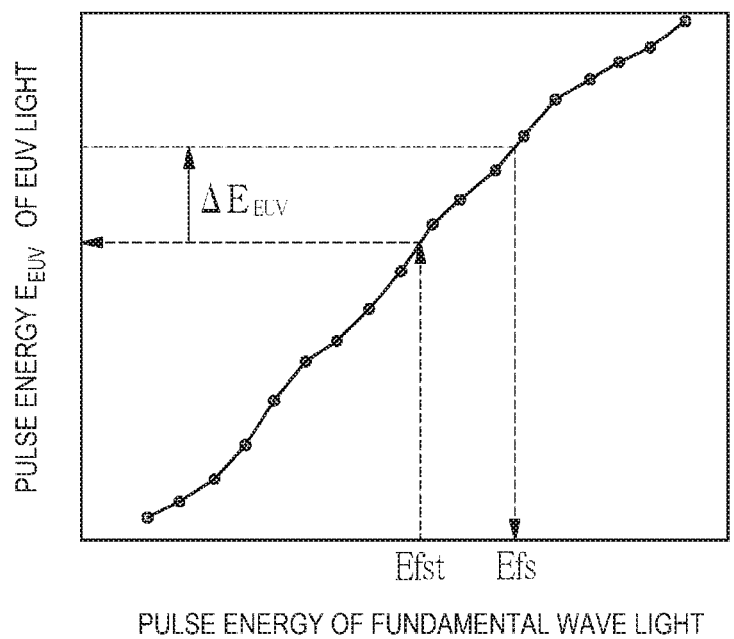
FIG. 10 is a graph showing an example of second data representing the relationship between the pulse energy of the EUV light and the pulse energy of fundamental wave light.

The second controller 61b then calculates the setting value Efs of the pulse energy of the fundamental wave light for achieving $\Delta E_{EUV}=0$ based on the second data shown in FIG. 10 (step S332). Specifically, the second controller 61b adds the amount of variation $E_{EUV}$ calculated in step S320 to the pulse energy of the EUV light 60 that is the pulse energy corresponding to the initial value Efst of the pulse energy of the fundamental wave light and calculates the pulse energy of the fundamental wave light that is the pulse energy corresponding to the value resulting from the addition, and the calculated pulse energy is used as the setting value Efs.

The second controller 61b may store a function representing the second data in place of the second data and calculate the setting value Efs by using the function. The function may be a linear line that approximates the second data.

3.3 Effects

According to the present embodiment, when the pressure of the rare gas in the rare gas chamber 43 changes, the input pulse energy Ef of the light from the femto-second laser apparatus 41 is controlled at high speed concurrently with the PID control performed by the first controller 61a on the flow rate control valve 44a. Therefore, according to the present embodiment, variation of the output of the EUV light 60 due to a change in the size of the through hole 51 due to the ablation and a resultant change in the pressure of the rare gas in the rare gas chamber 43 can be suppressed, whereby the EUV light 60 that is stable for a long period can be outputted.

In the present embodiment, since the speed at which the exhauster 47 exhausts the gas is fast, a change in the pressure in the filter chamber 46 is small even when the pressure of the rare gas in the rare gas chamber 43 changes, whereby the pressure P2 detected with the second pressure sensor 48 can be maintained at a value close to the vacuum pressure. Therefore, in the present embodiment, the pressure P2 detected with the second pressure sensor 48 is not used to control the output of the EUV light 60.

4. Second Embodiment

In the first embodiment, the amount of variation $\Delta E_{EUV}$ of the pulse energy $\Delta E_{EUV}$ of the EUV light 60 is calculated based on the pressure P1 detected with the first pressure sensor 45, but the pressure of the rare gas in the light focused position Cp can differ from the detected pressure P1. When the pressure of the rare gas in the light focused position Cp differs from the detected pressure P1, the amount of variation $\Delta E_{EUV}$ is unlikely to be accurately determined.

In a second embodiment of the present disclosure, the accuracy of the calculation of the amount of variation $\Delta E_{EUV}$ is improved by accurately determining the pressure of the rare gas in the light focused position Cp. A laser system 40b according to the second embodiment will be described below. In the following description, substantially the same portion as a component of the laser system 40a according to the first embodiment has the same reference character and will not be described as appropriate.

4.1 Configuration

Figure 11:
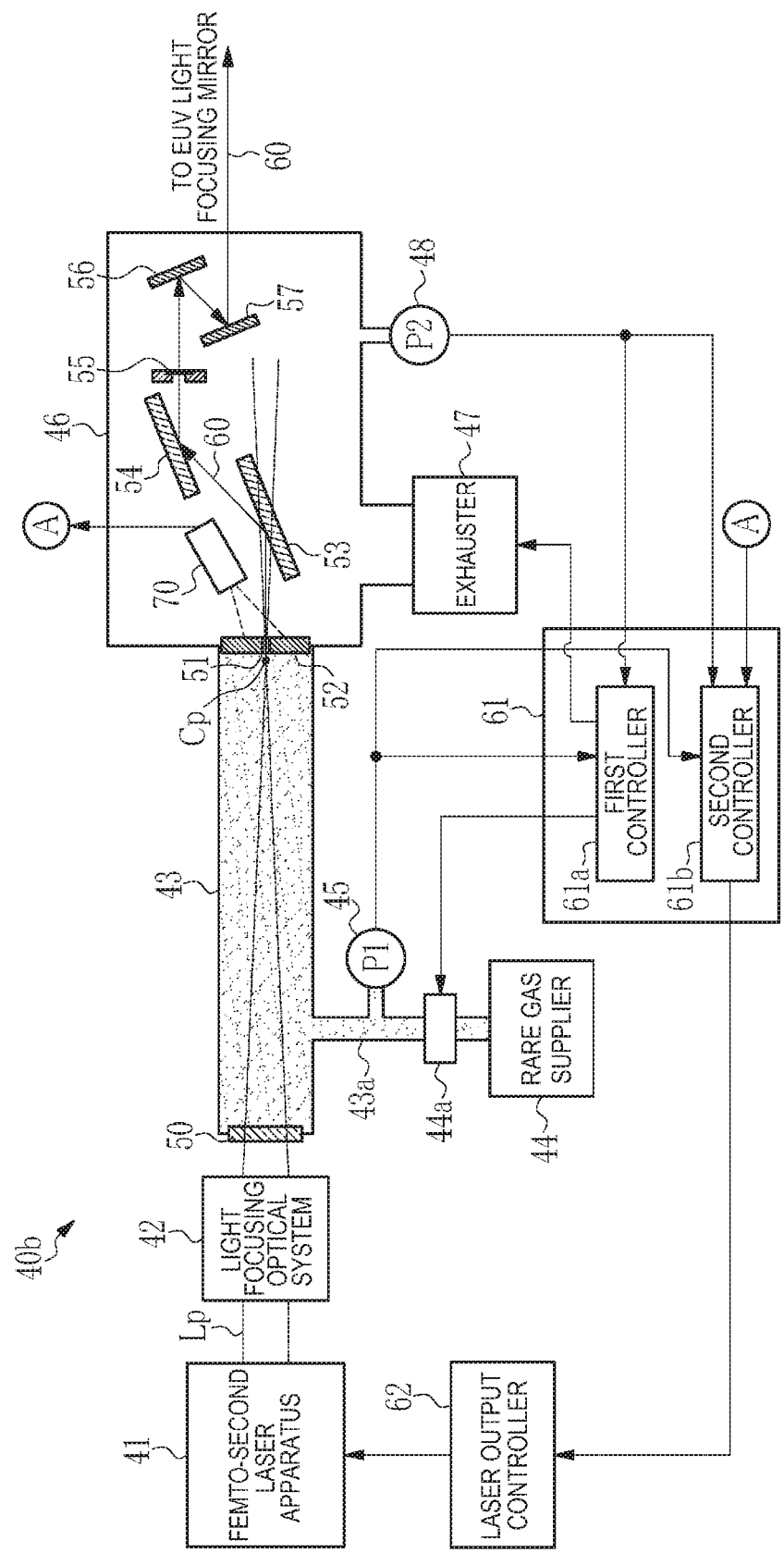
FIG. 11 schematically shows the configuration of a laser system according to a second embodiment.

FIG. 11 schematically shows the configuration of the laser system 40b according to the second embodiment of the present disclosure. The laser system 40b according to the present embodiment includes an imager 70 in addition to the components of the laser system 40a according to the first embodiment. The imager 70 is so disposed in the filter chamber 46 as to capture an image of the partition wall 52 including the through hole 51. Image data captured by the imager 70 is transmitted to the second controller 61b.

In the present embodiment, the pressure P2 detected with the second pressure sensor 48 is inputted in addition to the pressure P1 detected with the first pressure sensor 45 to the second controller 61b. In the present embodiment, the second controller 61b is configured to calculate an area Spin of the through hole 51 based on the image data transmitted from the imager 70. The second controller 61b is further configured to calculate pressure P' of the rare gas in the light focused position Cp based on the area Spin and the detected pressure P1 and P2. The other configurations of the laser system 40b according to the present embodiment are the same as those in the first embodiment.

4.2 Operation

Figure 12:
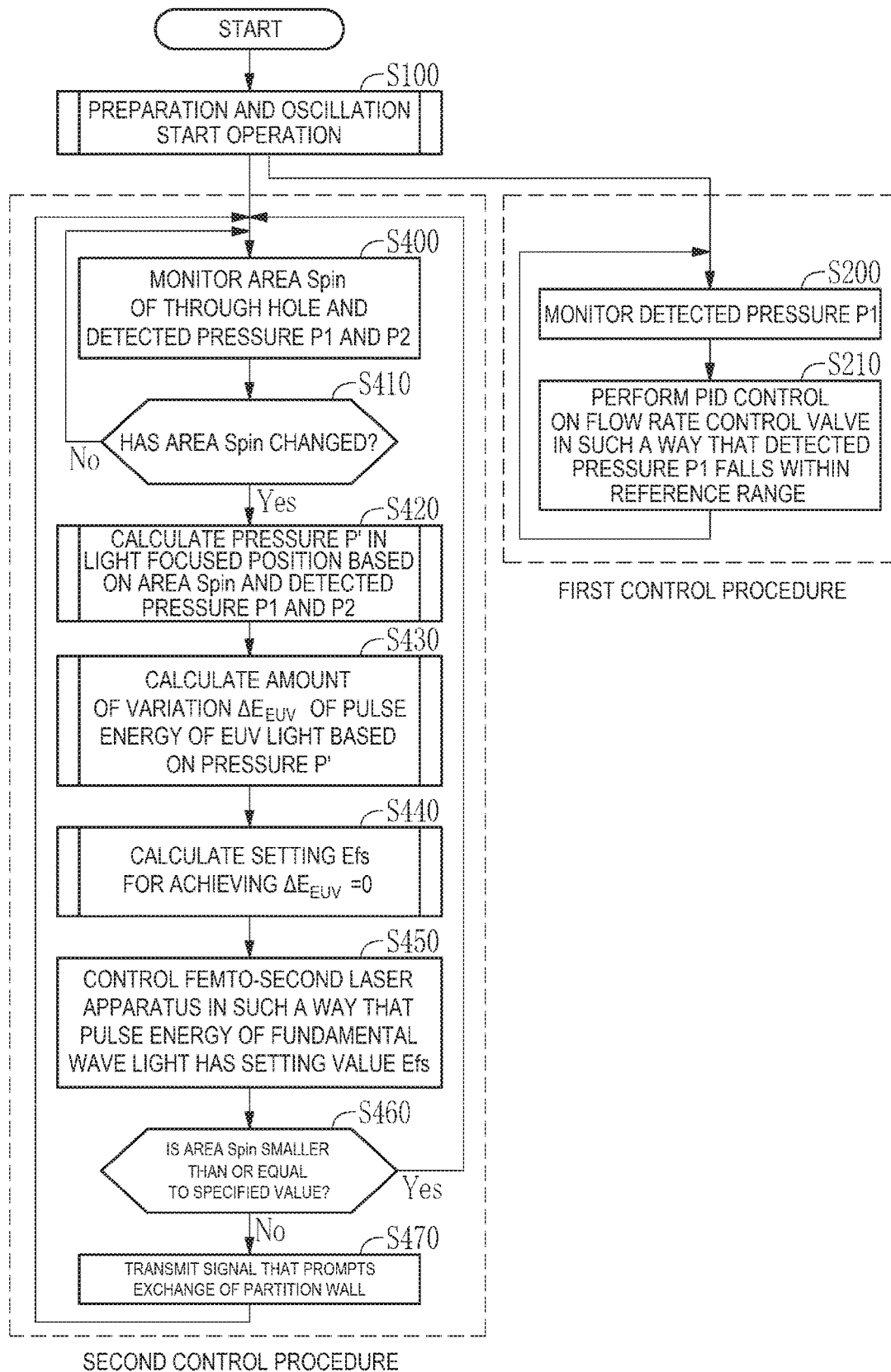
FIG. 12 is a flowchart showing the procedure in accordance with which the laser system is controlled by the primary controller.

The operation of the laser system 40b according to the second embodiment will next be described. FIG. 12 shows the procedure in accordance with which the laser system 40b is controlled by the primary controller 61. The primary controller 61 first, as preparation operation, causes the exhauster 47 to start operating, starts supply of the rare gas into the rare gas chamber 43, and then causes the femto-second laser apparatus 41 to start oscillation (step S100). Step 100 is the same as that in the first embodiment.

The first controller 61a and the second controller 61b then concurrently perform a first control procedure (steps S200 to S210) and a second control procedure (steps S400 to S470).

The first control procedure is the same as that in the first embodiment and will therefore not be described.

In the second control procedure, the second controller 61b first monitors the area Spin of the through hole 51 and the detected pressure P1 and P2 (step S400) and evaluates whether or not the area Spin has changed by at least a predetermined value (step S410). When the area Spin has not changed by at least the predetermined value (No in step S410), the second controller 61b returns to the process in step S400. When the area Spin has changed by at least the predetermined value (Yes in step S410), the second controller 61b calculates the pressure P' of the rare gas in the light focused position Cp based on the area Spin and the detected pressure P1 and P2 (step S420). The second controller 61b calculates the amount of variation $\Delta E_{EUV}$ from the maximum of the pulse energy $E_{EUV}$ of the EUV light 60 based on the pressure P' of the rare gas in the light focused position Cp (step S430).

The second controller 61b then calculates the setting value Efs of the pulse energy of the fundamental wave light for achieving $\Delta E_{EUV}=0$ (step S440). The second controller 61b then transmits a control signal that causes the pulse energy of the pumping pulsed laser light Lp as the fundamental wave light to be the setting value Efs to the laser output controller 62 (step S450).

The second controller 61b then evaluates whether or not the area Spin is smaller than or equal to a specified value (step S460). When the area Spin is smaller than or equal to the specified value (Yes in step S460), the second controller 61b returns to the process in step S400. When the area Spin is greater than the specified value (No in step S460), the second controller 61b transmits a signal that prompts exchange of the partition wall 52 to a display or an external apparatus that is not shown (step S470) and returns to the process in step S400.

4.2.1 Calculate Pressure in Light Focused Position

Figure 13:
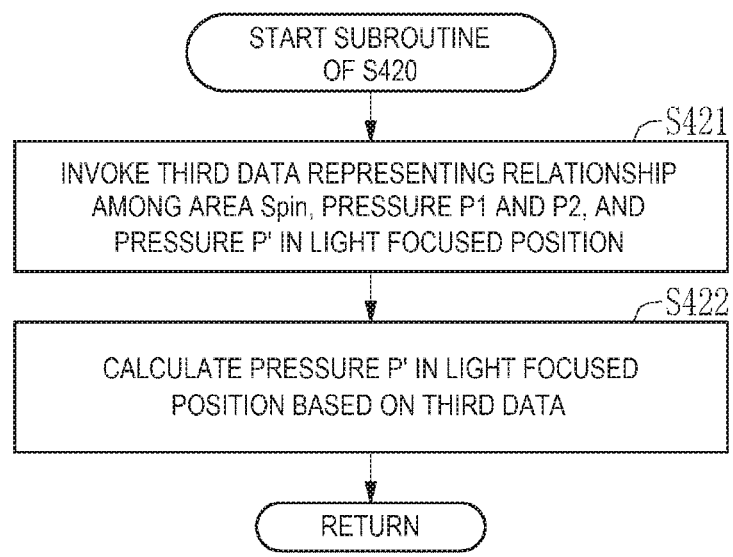
FIG. 13 is a flowchart showing a subroutine of step S420 in the flowchart of FIG. 12.

Step S420 in the flowchart of FIG. 12 will next be described in detail. FIG. 13 shows a subroutine of step S420. In the subroutine, the second controller 61b first invokes third data (see FIG. 14) representing the relationship among the area Spin, the pressure P1 and P2, and the pressure P' of the rare gas in the light focused position Cp (step S421). The third data is stored in the second controller 61b or a storage that is not shown.

The second controller 61b then calculates the pressure P' of the rare gas in the light focused position Cp based on the third data shown in FIG. 14 (step S422). Specifically, the third data is a tabulated relationship among the area Spin, the pressure P1 and P2, and the pressure P'. The second controller 61b refers to the tabulated data shown in FIG. 14 and determines the pressure P' to which the measured area Spin and the detected pressure P1 and P2 most correspond.

The second controller 61b may store a function P'=(P1, P2, Spin) representing the third data in place of the third data and calculate the pressure P' by using the function.

4.2.2 Calculate Amount of Variation in Pulse Energy of EUV Light

Figure 15:
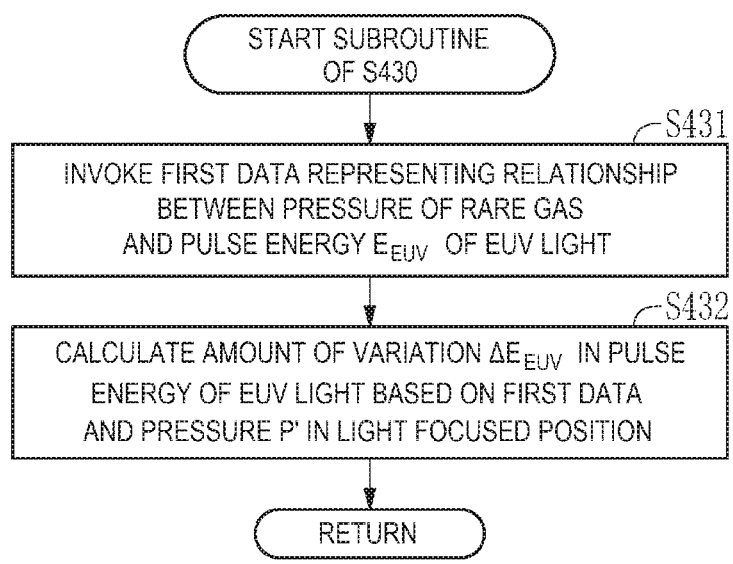
FIG. 15 is a flowchart showing a subroutine of step S430 in the flowchart of FIG. 12.

Step S430 in the flowchart of FIG. 12 will next be described in detail. FIG. 15 shows a subroutine of step S430. In the subroutine, the second controller 61b first invokes first data representing the relationship between the pressure of the rare gas chamber 43 and the pulse energy $E_{EUV}$ of the EUV light 60 (step S431). The first data is the same as the first data shown in FIG. 8 in the first embodiment. The first data is stored in the second controller 61b or a storage that is not shown.

The second controller 61b then calculates the amount of variation $\Delta E_{EUV}$ in the pulse energy $E_{EUV}$ of the EUV light 60 based on the first data and the pressure P' of the rare gas in the light focused position Cp calculated in step S420 (step S432). Specifically, the second controller 61b based on the first data replaces the pressure P1 of the rare gas with the pressure P' in the graph shown in FIG. 8 and calculates the difference between the pulse energy of the EUV light 60 that is the pulse energy corresponding to the pressure P' and the maximum of the pulse energy of the EUV light 60.

The second controller 61b may store a function representing the first data in place of the first data and calculate the amount of variation $\Delta E_{EUV}$ by using the function.

The details of step S440 in the present embodiment are the same as those in step S330 in the first embodiment. That is, the second controller 61b calculates the setting value Efs of the pulse energy of the fundamental wave light for achieving $\Delta E_{EUV}=0$ based on the second data shown in FIG. 10.

4.3 Effects

According to the present embodiment, the pressure P' of the rare gas in the light focused position Cp is calculated based on the measured area Spin of the through hole 51, and the amount of variation $\Delta E_{EUV}$ is calculated based on the pressure P', whereby the accuracy of the calculation of the amount of variation $\Delta E_{EUV}$ is improved. The output of the EUV light 60 can thus be stabilized for a long period.

In the present embodiment, the calculation of the pressure P' of the rare gas in the light focused position Cp uses the area Spin and the detected pressure P1 and P2, but the detected pressure P2 is not essential. The reason for this is that the detected pressure P1 is about $10^4$ Pa, whereas the detected pressure P2 is as low as about $10^{-2}$ Pa, so that there is no problem of assumption of P2=0 depending on the required accuracy of the calculation of the pressure P'.

Figure 16:
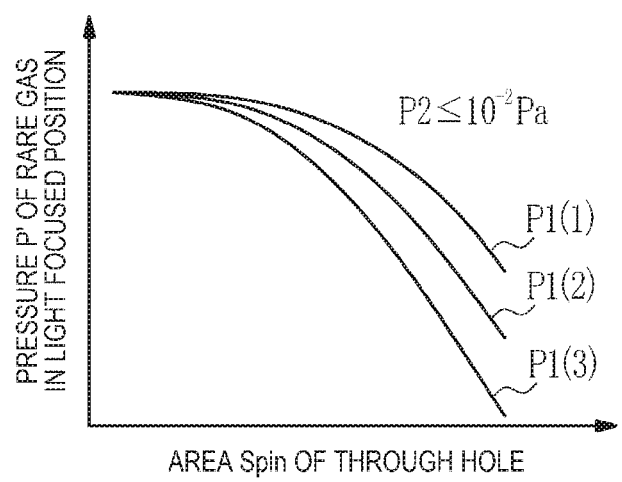
FIG. 16 shows graphs schematically illustrating a function P'=f(P1, P2, Spin) representing the third data in a case where P2=0 is assumed as an approximation.

FIG. 16 schematically shows the function P'=f(P1, P2, Spin) representing the third data in a case where P2=0 is assumed as an approximation. In an actual apparatus, since P2≤$10^{-2}$ Pa is satisfied and P1 is about $10^4$ Pa, P2=0 can be satisfied as an approximation. As described above, the relationship between the pressure P' of the rare gas in the light focused position Cp and the area Spin of the through hole 51 changes depending on the pressure P1 detected with the first pressure sensor 45.

5. Third Embodiment

In the first and second embodiments, the output of the EUV light 60 is controlled based on the pressure in the rare gas chamber 43. It is, however, conceivable that the output of the EUV light 60 changes due to deterioration of the beam separators and other optical elements in the filter chamber 46.

In a third embodiment of the present disclosure, the output of the EUV light 60 is stabilized by actual measurement of the output of the EUV light 60. A laser system 40c according to the third embodiment will be described below. In the following description, substantially the same portion as a component of the laser system 40a according to the first embodiment has the same reference character and will not be described as appropriate.

5.1 Configuration

Figure 17:
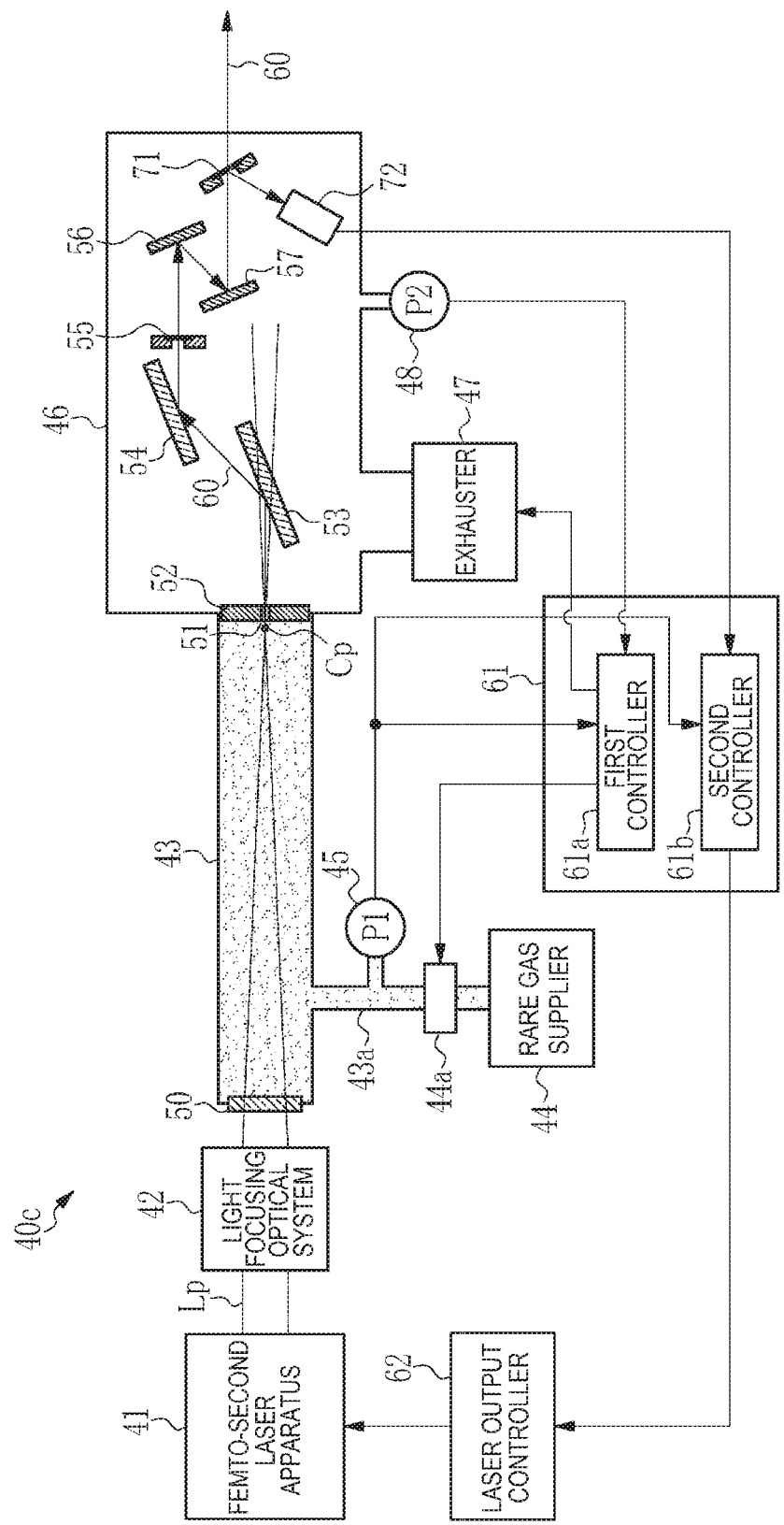
FIG. 17 schematically shows the configuration of a laser system according to a third embodiment.

FIG. 17 schematically shows the configuration of the laser system 40c according to the third embodiment of the present disclosure. The laser system 40c according to the present embodiment includes a beam splitter 71 and an optical sensor 72 in addition to the components of the laser system 40a according to the first embodiment. The beam splitter 71 and then optical sensor 72 are disposed in the filter chamber 46.

The beam splitter 71 is disposed in the optical path of the EUV light 60 outputted as the reflected light from the second multilayer film mirror 57 with the beam splitter 71 inclining with respect to the axis of the optical path. The beam splitter 71 reflects part of the EUV light 60 incident thereon. The beam splitter 71 is, for example, a Zr-thin-film filter that is a filter to which a Zr thin film is fixed.

The optical sensor 72 is disposed in the optical path of the light reflected off the beam splitter 71. The optical sensor 72 is, for example, a photodiode, detects light incident thereon, and outputs a measurement signal corresponding to the pulse energy of the EUV light 60. The measurement signal outputted from the optical sensor 72 is transmitted to the second controller 61b. In the present embodiment, the second controller 61b determines the setting value Efs of the pulse energy of the fundamental wave light in consideration of the measured pulse energy of the EUV light 60 in addition to the amount of variation $\Delta E_{EUV}$ described above. Further, the second controller 61b has a time measurement function in the present embodiment. The other configurations of the laser system 40c according to the present embodiment are the same as those in the first embodiment.

5.2 Operation

Figure 18:
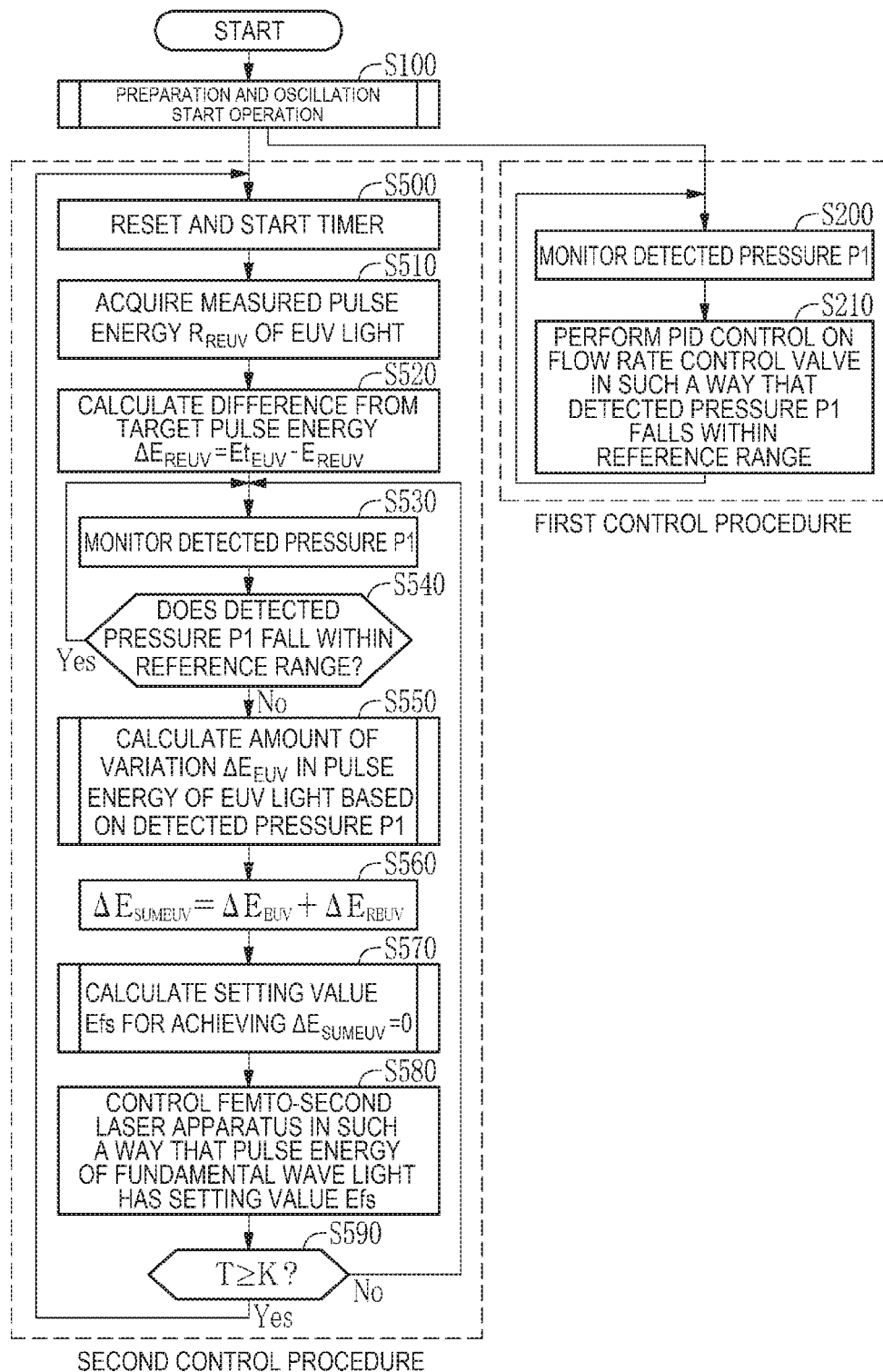
FIG. 18 is a flowchart showing the procedure in accordance with which the laser system is controlled by the primary controller.

The operation of the laser system 40c according to the third embodiment will next be described. FIG. 18 shows the procedure in accordance with which the laser system 40c is controlled by the primary controller 61. The primary controller 61 first, as preparation operation, causes the exhauster 47 to start operating, starts supply of the rare gas into the rare gas chamber 43, and then causes the femto-second laser apparatus 41 to start oscillation (step S100). Step S100 is the same as that in the first embodiment.

The first controller 61a and the second controller 61b then concurrently perform a first control procedure (steps S200 to S210) and a second control procedure (steps S500 to S590). The first control procedure is the same as that in the first embodiment and will therefore not be described.

In the second control procedure, the second controller 61b first rests and resets a timer T and causes the timer T to start time measurement (step S500). The second controller 61b then acquires measured pulse energy $E_{REUV}$ of the EUV light 60 based on the measurement signal transmitted from the optical sensor 72 (step S510). The second controller 61b then calculates a difference $\Delta E_{REUV}$ between the measured value $E_{REUV}$ and a target pulse energy $Et_{EUV}$ of the EUV light 60 based on Expression 1 below (step S520).

$$\Delta E_{REUV} = Et_{EUV} - E_{REUV} \qquad (1)$$

The target pulse energy $Et_{EUV}$ is the maximum $E_{EUV\#M}$ of the pulse energy of the EUV light 60 in the initial state in which the pulse energy of the fundamental wave light has the initial value Efst in a case where the optical elements in the filter chamber 46 is not deteriorated (see FIG. 8).

The second controller 61b then monitors the pressure P1 detected with the first pressure sensor 45 (step S530) and evaluates whether or not the detected pressure P1 falls within the reference range RPs (step S540). When the detected pressure P1 falls within the reference range RPs (Yes in step S540), the second controller 61b returns to the process in step S530. When the detected pressure P1 does not fall within the reference range RPs (No in step S540), the second controller 61b calculates the amount of variation $\Delta E_{EUV}$ from the target pulse energy, which is the maximum of the pulse energy $E_{EUV}$ of the EUV light 60 based on the detected pressure P1 (step S550). The details of step S550 are the same as those in step S320 in the first embodiment.

The second controller 61b then corrects the amount of variation $\Delta E_{EUV}$ and acquires the amount of variation $\Delta E_{SUMEUV}$ after the correction (step S560) based on Expression (2) below.

$$\Delta E_{SUMEUV} = \Delta E_{EUV} + \Delta E_{REUV} \qquad (2)$$

Figure 19:
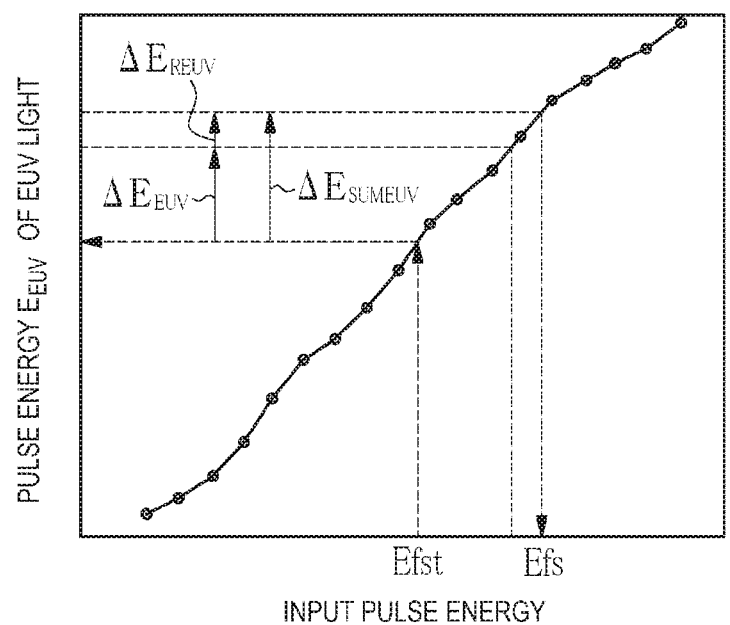
FIG. 19 is a graph showing an example of the second data representing the relationship between the pulse energy of the EUV light and the pulse energy of fundamental wave light.

The second controller 61b then calculates the setting value Efs of the pulse energy of the fundamental wave light for achieving $\Delta E_{SUMEUV} = 0$ based on the second data shown in FIG. 19 (step S570). In the present embodiment, the second controller 61b adds the amount of variation $E_{SUMEUV}$ after the correction to the pulse energy of the EUV light 60 that is the pulse energy corresponding to the initial value Efst of the pulse energy of the fundamental wave light and calculates the pulse energy of the fundamental wave light that is the pulse energy corresponding to the value resulting from the addition, and the calculated pulse energy is used as the setting value Efs.

The second controller 61b then transmits a control signal that causes the pulse energy of the pumping pulsed laser light Lp as the fundamental wave light to be the setting value Efs to the laser output controller 62 (step S580).

The second controller 61b then evaluates whether or not the timer T is showing a period longer than or equal to a predetermined period K (step S590). When the timer T is showing a period shorter than the predetermined period K (No in step S590), the second controller 61b returns to the process in step S530. When the timer T is showing a period longer than or equal to the predetermined period K (Yes in step S590), the second controller 61b returns to the process in step S500. That is, the second controller 61b acquires the measured pulse energy $E_{REUV}$ of the EUV light 60 whenever the predetermined period K elapses and corrects the amount of variation $\Delta E_{EUV}$. The predetermined period K ranges, for example, from 0.5 to 24 hours.

5.3 Effects

According to the present embodiment, the pulse energy of the EUV light 60 is measured on a regular basis, followed by correction of the amount of variation $\Delta E_{EUV}$ determined from the detected pressure P1, and calculation of the setting value Efs of the pulse energy of the fundamental wave light based on the corrected amount of variation $\Delta E_{SUMEUV}$. Therefore, when any of the optical elements in the filter chamber 46 deteriorates, and the pule energy of the EUV light 60 outputted from the filter chamber 46 changes accordingly, the change can be corrected and the output of the EUV light 60 is stabilized.

In the present embodiment, the beam splitter 71 is fixed in the optical path of the EUV light 60. Instead, the beam splitter 71 may be retractable from the optical path of the EUV light 60. For example, the beam splitter 71 may be disposed on a linear stage that is not shown so that the beam splitter 71 is movable, and the beam splitter 71 may be placed in the optical path only when the pulse energy of the EUV light 60 is measured. Further, when the reflectance is measured by the reflectance measurement apparatus, the beam splitter 71 may be retracted from the optical path, whereas when the reflectance is not measured by the reflectance measurement apparatus, the beam splitter 71 may be placed in the optical path.

6. Fourth Embodiment

In the first to third embodiments, the rare gas chamber 43 is connected to the filter chamber 46 via the partition wall 52, through which the through hole 51 is formed, but the laser system does not necessarily have the configuration described above.

In a fourth embodiment of the present disclosure, a capillary fiber that accommodates the rare gas is disposed in the filter chamber. In the present disclosure, the term "chamber" means a cell that accommodates a gas or any other substance and is intended to include a hollow fiber, such as a capillary fiber. A laser system 40d according to the fourth embodiment will be described below. In the following description, substantially the same portion as a component of the laser systems according to the embodiments described above has the same reference character and will not be described as appropriate.

6.1 Configuration

Figure 20:
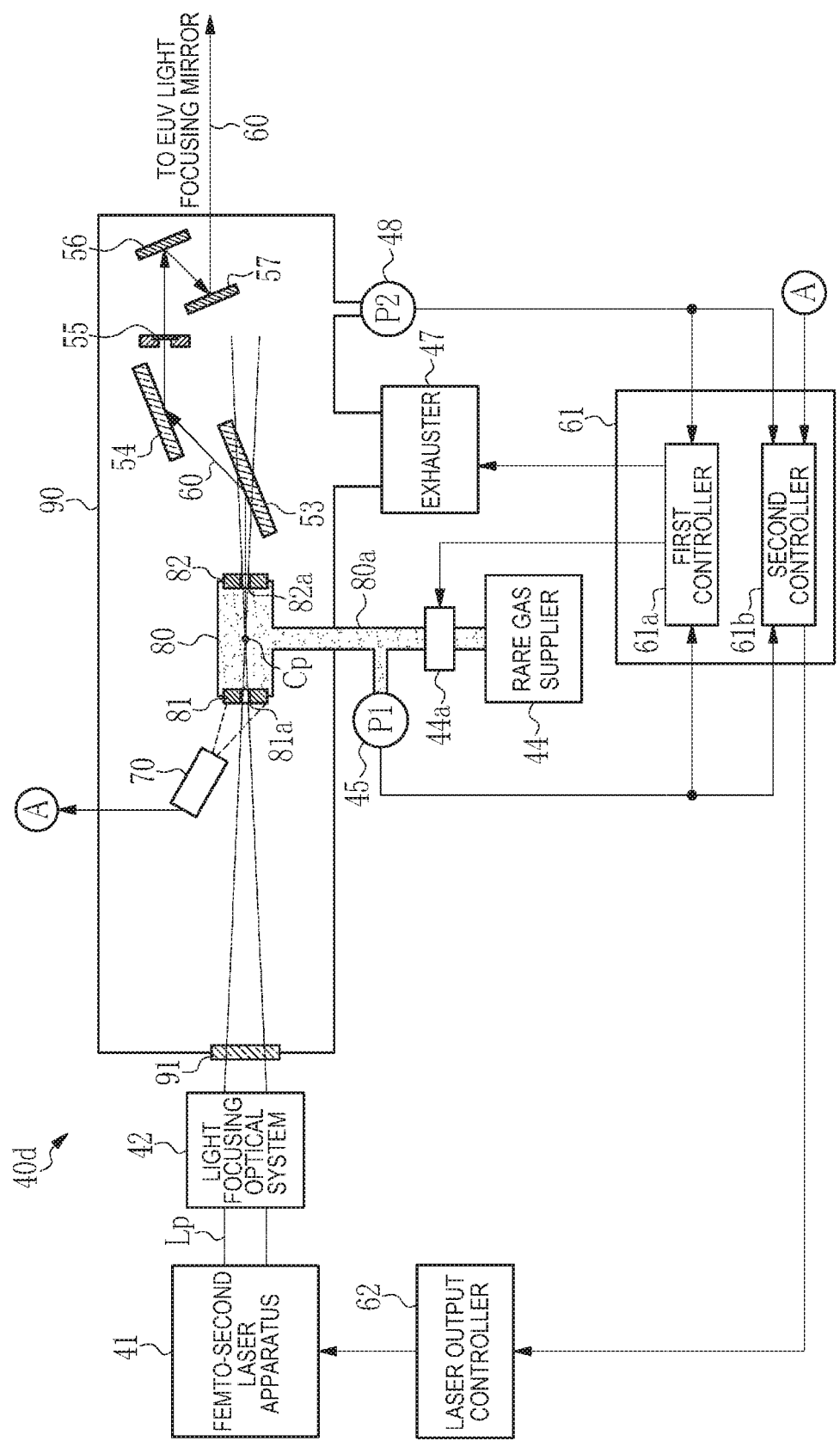
FIG. 20 schematically shows the configuration of a laser system according to a fourth embodiment.

FIG. 20 schematically shows the configuration of the laser system 40d according to the fourth embodiment of the present disclosure. The laser system 40d according to the fourth embodiment includes the femto-second laser apparatus 41, the light focusing optical system 42, a capillary fiber 80, the rare gas supplier 44, the first pressure sensor 45, a filter chamber 90, the exhauster 47, the second pressure sensor 48, and the imager 70.

The capillary fiber 80 is configured to accommodate the rare gas and includes a first partition wall 81, through which a first through hole 81a is formed, and a second partition wall 82, through which a second through hole 82a is formed. The first partition wall 81 is located at the light-incident-side end of the capillary fiber 80 that is the end on which the pumping pulsed laser light Lp is incident. The second partition wall 82 is located at the light-exiting-side end of the capillary fiber 80 that is the end via which the pumping pulsed laser light Lp exits.

The rare gas supplier 44 is connected to the capillary fiber 80 via a pipe 80a. The first pressure sensor 45 configured to measure the pressure in the capillary fiber 80 is connected to the pipe 80a. The flow rate control valve 44a is provided between the portion where the first pressure sensor 45 is connected to the pipe 80a and the rare gas supplier 44. The capillary fiber 80 and part of the pipe 80a are disposed in the filter chamber 90.

The first partition wall 81 and the second partition wall 82 are made of metal or glass that is unlikely to undergo ablation under the pumping pulsed laser light Lp. Examples of the metal material that is unlikely to undergo ablation due to the pumping pulsed laser light Lp may include tungsten (W), molybdenum (Mo), tantalum (Ta), and other high-melting-point metals.

The filter chamber 90 includes a window 91. The window 91 is so disposed that the pumping pulsed laser light Lp having exited out of the light focusing optical system 42 is incident on the window 91 substantially at right angles. The window 91 is made, for example, of an $MgF_2$ crystal and so disposed that the optical axis substantially coincides with the axis of the pumping pulsed laser light. The thickness of the window 91 is, for example, about 1 mm.

The capillary fiber 80 is so disposed that the pumping pulsed laser light Lp having entered the filter chamber 90 via the window 91 passes through the first through hole 81a and the second through hole 82a. In the present embodiment, the light focusing optical system 42 is configured to focus the pumping pulsed laser light Lp in the capillary fiber 80. That is, the light focused position Cp is present in the optical path of the pumping pulsed laser light Lp between the first through hole 81a and the second through hole 82a. The pumping pulsed laser light Lp focused in the light focused position Cp excites the rare gas to produce harmonic light containing odd-numbered, high-order, at least higher than or equal to 59-th harmonic waves.

In the filter chamber 90 are disposed the first beam separator 53, the second beam separator 54, the bandpass filter 55, the first multilayer film mirror 56, and the second multilayer film mirror 57. The first beam separator 53 is so disposed that the harmonic light and the fundamental wave light having exited out of the capillary fiber 80 and passed through the second through hole 82a are incident as P-polarized light on the first beam separator 53 and the angle of incidence of the fundamental wave light is substantially Brewster's angle. The configurations and arrangement of the first beam separator 53, the second beam separator 54, the bandpass filter 55, the first multilayer film mirror 56, and the second multilayer film mirror 57 are the same as those in the embodiments described above.

The exhauster 47 and the second pressure sensor 48 are connected to the filter chamber 90. The exhauster 47 and the second pressure sensor 48 have the same configurations as those in the embodiments described above. The imager 70 described above is disposed in the filter chamber 90. In the present embodiment, the imager 70 is so disposed as to capture an image of the first partition wall 81 including the first through hole 81a. Image data captured with the imager 70 is transmitted to the second controller 61b.

The configurations of the first controller 61a and the second controller 61b provided in the primary controller 61 are the same as those in the second embodiment. The second controller 61b is configured to calculate an area Spina of the first through hole 81a based on the image data transmitted from the imager 70. The second controller 61b is configured to further calculate pressure P''' of the rare gas in the light focused position Cp based on the area Spina of the first through hole 81a and the detected pressure P1 and P2.

6.2 Operation

Figure 21:
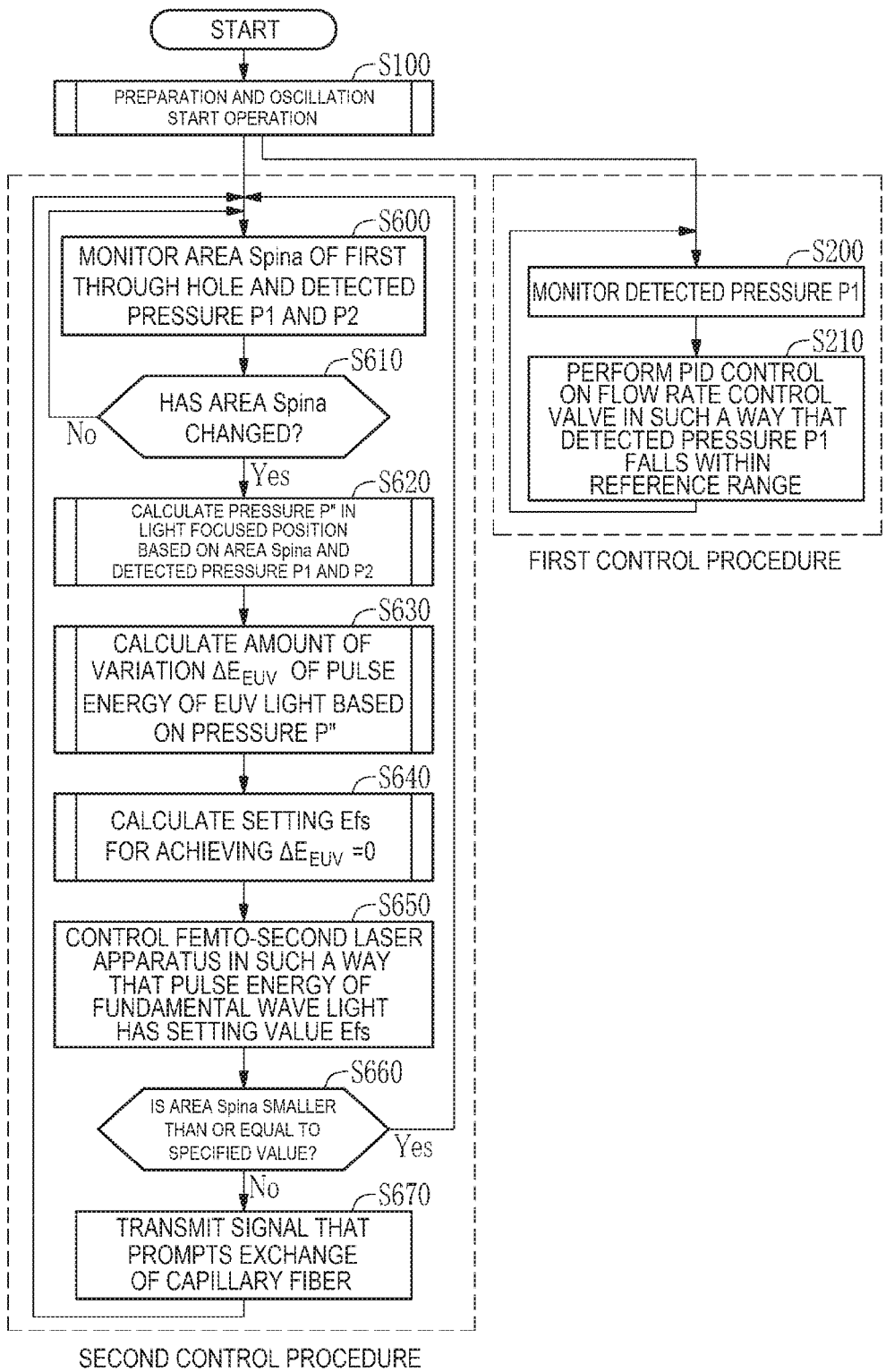
FIG. 21 is a flowchart showing the procedure in accordance with which the laser system is controlled by the primary controller.

FIG. 21 shows the procedure in accordance with which the laser system 40d is controlled by the primary controller 61. The control procedure is the same as the control procedure in the second embodiment shown in FIG. 12 and will therefore not be described. In the present embodiment, when the area Spina of the first through hole 81a is greater than a specified value, the second controller 61b transmits a signal that prompts exchange of the capillary fiber 80 to a display or an external apparatus that is not shown (step S670).

According to the present embodiment, the pressure P''' of the rare gas in the light focused position Cp is calculated based on the measured area Spina of the first through hole 81a, and the amount of variation $\Delta E_{EUV}$ is calculated based on the pressure P''', whereby the accuracy of the calculation of the amount of variation $\Delta E_{EUV}$ is improved. The output of the EUV light 60 can thus be stabilized for a long period.

In the present embodiment, the capillary fiber that replaces the rare gas chamber in the second embodiment is disposed in the filter chamber, and the capillary fiber may be disposed in the filter chamber in place of the rare gas chamber as variations of the first and third embodiments.

Further, in the present embodiment, a partition wall having a through hole formed therethrough is provided at each end of the capillary fiber. Instead, no partition wall may be provided, and the opening at each end of a hollow fiber, such as the capillary fiber, may be considered as a through hole.

In the embodiments described above, the beam separators disposed in the filter chamber are each a dichroic mirror configured to reflect light that belongs to the wavelength bands to which the pumping pulsed laser light Lp and the EUV light 60 belong, and the dichroic mirrors may each be replaced with a plurality of pinholes disposed in the optical axis of the EUV light 60. Passage of the pumping pulsed laser light Lp through the pinholes can be suppressed by using the fact that the beam divergence of the pumping pulsed laser light Lp is greater than the beam divergence of the EUV light 60, allowing selective passage of the EUV light 60 through the pinholes.

In the embodiments described above, the first controller 61a and the second controller 61b provided in the primary controller 61 are components separate from each other and may instead be configured as a single controller. The primary controller 61 is not necessarily formed of hardware, such as a semiconductor circuit, and may be formed of a control circuit that executes a program read from a memory, such as a CPU. Still instead, the primary controller 61 may be a gate array capable of programming, such as an FPGA (field-programmable gate array).

7. Femto-Second Laser Apparatus

A specific configuration and operation of the femto-second laser apparatus 41 will next be described.

7.1 Configuration

Figure 22:
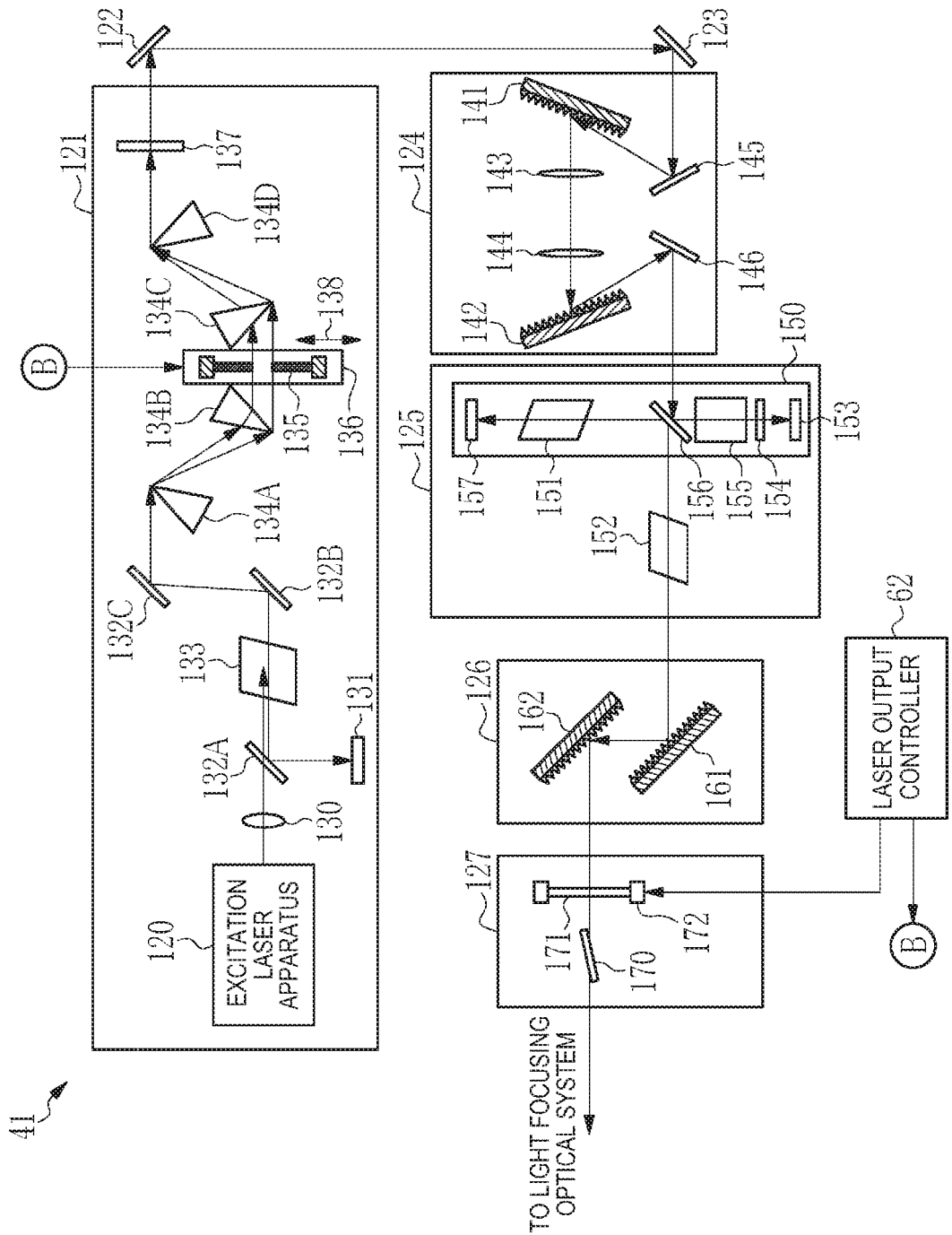
FIG. 22 shows an example of the configuration of a femto-second laser apparatus.

FIG. 22 shows an example of the configuration of the femto-second laser apparatus 41. The femto-second laser apparatus 41 includes a mode-locked laser apparatus 121, high reflection mirrors 122 and 123, a pulse extender 124, an amplifier 125, a pulse compressor 126, and an attenuator 127.

The mode-locked laser apparatus 121 includes an excitation laser apparatus 120, a light focusing lens 130, a saturable absorption mirror 131, a dichroic mirror 132A, high reflection mirrors 132B and 132C, and a titanium sapphire crystal 133. The mode-locked laser apparatus 121 further includes prisms 134A, 134B, 134C, and 134D, a slit 135, a uniaxial stage 136, and an output coupling mirror 137.

The saturable absorption mirror 131 and the output coupling mirror 137 form an optical resonator. The dichroic mirror 132A, the titanium sapphire crystal 133, the high reflection mirrors 132B and 132C, the prisms 134A and 134B, the slit 135, and the prisms 134C and 134D are sequentially arranged along the optical path of the optical resonator. The apex angles of the prisms 134A, 134B, 134C, and 134D are each preferably so set that the angle of incidence of light that enters the prism and the angle of emergence of the light that exits out of the prism are each substantially Brewster's angle.

The prisms 134A and 134B are so disposed as to have opposite dispersion directions and cause light to enter and exit at Brewster's angle. The prisms 134C and 134D are so disposed as to have opposite dispersion directions and cause light to enter and exit at Brewster's angle.

The slit 135 is so disposed that the opening thereof is located in the optical path between the prisms 134B and 134C. The slit 135 is so fixed to the uniaxial stage 136 via a holder that is not shown as to move in a movement direction 138 indicated by the arrow, for example, in a direction substantially perpendicular to the axis of the optical path.

The high reflection mirrors 122 and 123 are so disposed as to reflect the pulsed laser light outputted from the mode-locked laser apparatus 121 and cause the reflected pulsed laser light to enter the pulse extender 124.

The pulse extender 124 includes gratings 141 and 142, light focusing lenses 143 and 144, and high reflection mirrors 145 and 146. The gratings 141 and 142 and the light focusing lenses 143 and 144 are so disposed as to extend the pulse duration of the incident pulsed laser light.

The amplifier 125 is configured to amplify the pulsed laser light outputted from the pulse extender 124. The amplifier 125 includes a regenerative amplifier 150 and an amplifier 152 including a titanium sapphire crystal. The regenerative amplifier 150 includes a titanium sapphire crystal 151, a high reflection mirror 153, a 214 plate 154, an electro-optical (EO) Pockels cell 155, a polarizer 156, a high reflection mirror 157, and an excitation laser apparatus that is not shown. The amplifier 152 includes a titanium sapphire crystal that is not shown and an excitation laser apparatus that is not shown.

The pulse compressor 126 includes gratings 161 and 162, which are disposed in the optical path of the pulsed laser light outputted from the amplifier 125.

The attenuator 127 includes a polarizer 170, a half wave plate 171, and a rotary stage 172. The rotary stage 172 is configured to hold the half wave plate 171 and rotate the half wave plate 171 around the optical axis thereof. The laser output controller 62 described above is configured to drive the rotary stage 172 to cause it to rotate the half wave plate 171 to control the transmittance at which the attenuator 127 transmits the pulsed laser light.

7.2 Operation

In the mode-locked laser apparatus 121, laser oscillation mode-locked in a wavelength region of the light that passes through the opening of the slit 135 occurs, and pulsed laser light having a femto-second pulse duration is outputted via the output coupling mirror 137. The pulsed laser light passes through the pulse extender 124, which extends the pulse duration of the pulsed laser light, and the resultant pulsed laser light is amplified by the regenerative amplifier 150. The amplified pulsed laser light is then further amplified by the amplifier 152. Controlling the EO Pockels cell 155 in the regenerative amplifier 150 allows selection of a pulse to be amplified and amplification of the selected pulse at a predetermined repetitive frequency.

The pulsed laser light amplified by the amplifier 125 is converted by the pulse compressor 126 into pulse laser light having a femto-second pulse duration again. Moving the position of the opening of the slit 135 along the movement direction 138 allows a change in the center wavelength of the pulsed laser light.

The laser output controller 62, when it receives a setting value of the pulse energy of the fundamental wave light from the primary controller 61, rotates the half wave plate 171 to rotate the polarization plane of the linearly polarized pulsed laser light outputted from the pulse compressor 126. The polarizer 170 transmits light formed of a P-polarized component and reflects light formed of the other polarization components. The pulse energy of the light from the femto-second laser apparatus 41 is therefore so controlled as to have the setting value. The transmittance at which the attenuator 127 transmits the pulsed laser light is so controlled as to fall within a range, for example, from 70 to 99%.

7.3 Effects

The femto-second laser apparatus 41 having the configuration described above does not change, for example, the thermal load on the elements present on the upstream of the attenuator 127 even when the pulse energy is changed by causing the attenuator 127 to control the pulse energy of the fundamental wave light outputted from the femto-second laser apparatus 41. Changes in thermal load on the titanium sapphire crystal and other optical elements present on the upstream of the attenuator 127 are therefore suppressed. As a result, the femto-second laser apparatus 41 can be stably operated.

When changes in thermal load on the titanium sapphire crystal and other optical elements present on the upstream of the attenuator 127 are small, the output of the excitation laser apparatus configured to excite the titanium sapphire crystal provided in the amplifier 125 described above may be controlled.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. A laser system comprising:
a laser apparatus configured to output pulsed laser light;
a rare gas chamber configured to accommodate a rare gas;
a light focusing optical system configured to focus, in the rare gas chamber, the pulsed laser light outputted from the laser apparatus to excite the rare gas;
a filter chamber configured to selectively transmit EUV light contained in harmonic light produced in the rare gas chamber;
an exhauster connected to the filter chamber;
at least one through hole disposed in an optical path of the pulsed laser light between the rare gas chamber and the filter chamber;
a rare gas supplier configured to supply the rare gas into the rare gas chamber;
a flow rate control valve configured to control a flow rate of the rare gas flowing from the rare gas supplier into the rare gas chamber;
a first pressure sensor configured to detect pressure of the rare gas in the rare gas chamber;
a first controller configured to control the flow rate control valve in such a way that the pressure detected with the first pressure sensor falls within a reference range;
a second controller configured to control pulse energy of the pulsed laser light outputted from the laser apparatus based at least on the pressure detected with the first pressure sensor; and
an imager configured to capture an image of an area including the through hole and output image data, wherein
the second controller is configured to calculate
an amount of variation from a maximum of the pulse energy of the EUV light based on a relationship between the pressure of the rare gas in the rare gas chamber and the pulse energy of the EUV light and control the laser apparatus based on a setting value of the pulse energy of the pulsed laser light that is a value calculated based on the amount of variation, and
an area of the through hole based on the image data and control the pulse energy of the pulsed laser light outputted from the laser apparatus based on the area and the pressure detected with the first pressure sensor.

2. The laser system according to claim 1, wherein
the second controller is configured to calculate the pressure of the rare gas in a light focused position where the pulsed laser light is focused based on the area and the pressure detected with the first pressure sensor and control the pulse energy of the pulsed laser light outputted from the laser apparatus based on the pressure of the rare gas in the light focused position.

3. The laser system according to claim 1, wherein
the imager is disposed in the filter chamber.

4. A laser system comprising:
a laser apparatus configured to output pulsed laser light;
a rare gas chamber configured to accommodate a rare gas;
a light focusing optical system configured to focus, in the rare gas chamber, the pulsed laser light outputted from the laser apparatus to excite the rare gas;
a filter chamber configured to selectively transmit EUV light contained in harmonic light produced in the rare gas chamber;
an exhauster connected to the filter chamber;
at least one through hole disposed in an optical path of the pulsed laser light between the rare gas chamber and the filter chamber;
a rare gas supplier configured to supply the rare gas into the rare gas chamber;
a flow rate control valve configured to control a flow rate of the rare gas flowing from the rare gas supplier into the rare gas chamber;
a first pressure sensor configured to detect pressure of the rare gas in the rare gas chamber;
a first controller configured to control the flow rate control valve in such a way that the pressure detected with the first pressure sensor falls within a reference range;
a second controller configured to control pulse energy of the pulsed laser light outputted from the laser apparatus based at least on the pressure detected with the first pressure sensor;
an imager configured to capture an image of an area including the through hole and output image data; and
a second pressure sensor configured to detect pressure in the filter chamber, wherein
the second controller is configured to calculate
an amount of variation from a maximum of the pulse energy of the EUV light based on a relationship between the pressure of the rare gas in the rare gas chamber and the pulse energy of the EUV light and control the laser apparatus based on a setting value of the pulse energy of the pulsed laser light that is a value calculated based on the amount of variation, and
an area of the through hole based on the image data and control the pulse energy of the pulsed laser light outputted from the laser apparatus based on the area, the pressure detected with the first pressure sensor, and the pressure detected with the second pressure sensor.

5. The laser system according to claim 4, wherein
the second controller is configured to calculate the pressure of the rare gas in a light focused position where the pulsed laser light is focused based on the area, the pressure detected with the first pressure sensor, and the pressure detected with the second pressure sensor and control the pulse energy of the pulsed laser light outputted from the laser apparatus based on the pressure of the rare gas in the light focused position.

6. The laser system according to claim 4, wherein the imager is disposed in the filter chamber.

7. A laser system comprising:
a laser apparatus configured to output pulsed laser light;
a rare gas chamber configured to accommodate a rare gas;
a light focusing optical system configured to focus, in the rare gas chamber, the pulsed laser light outputted from the laser apparatus to excite the rare gas;
a filter chamber configured to selectively transmit EUV light contained in harmonic light produced in the rare gas chamber;
an exhauster connected to the filter chamber;
at least one through hole disposed in an optical path of the pulsed laser light between the rare gas chamber and the filter chamber;
a rare gas supplier configured to supply the rare gas into the rare gas chamber;
a flow rate control valve configured to control a flow rate of the rare gas flowing from the rare gas supplier into the rare gas chamber;
a first pressure sensor configured to detect pressure of the rare gas in the rare gas chamber;
a first controller configured to control the flow rate control valve in such a way that the pressure detected with the first pressure sensor falls within a reference range; and
a second controller configured to control pulse energy of the pulsed laser light outputted from the laser apparatus based at least on the pressure detected with the first pressure sensor, wherein
the rare gas chamber is a hollow fiber and is disposed in the filter chamber.

8. The laser system according to claim 7, wherein the through hole includes a first through hole located at a light-incident-side end of the hollow fiber that is an end on which the pulsed laser light is incident and a second through hole located at a light-exiting-side end of the hollow fiber that is an end via which the pulsed laser light exits.

9. The laser system according to claim 8, further comprising:
an imager configured to capture an image of an area including the first through hole and output image data; and wherein
the second controller is configured to calculate an area of the first through hole based on the image data and control the pulse energy of the pulsed laser light outputted from the laser apparatus based on the area and the pressure detected with the first pressure sensor.

* * * * *